US012257807B2

(12) United States Patent
Adami

(10) Patent No.: US 12,257,807 B2
(45) Date of Patent: Mar. 25, 2025

(54) SINGLE FACER FOR MANUFACTURING A CORRUGATED BOARD WITH A PRESSING UNIT WITH A CONTINUOUS FLEXIBLE MEMBER

(71) Applicant: FOSBER S.P.A., Pescaglia (IT)

(72) Inventor: Mauro Adami, Viareggio (IT)

(73) Assignee: FOSBER S.P.A., Pescaglia (IT)

( * ) Notice: Subject to any disclaimer, the term of this patent is extended or adjusted under 35 U.S.C. 154(b) by 250 days.

(21) Appl. No.: 17/923,307

(22) PCT Filed: Apr. 30, 2021

(86) PCT No.: PCT/EP2021/061470
§ 371 (c)(1),
(2) Date: Nov. 4, 2022

(87) PCT Pub. No.: WO2021/224141
PCT Pub. Date: Nov. 11, 2021

(65) Prior Publication Data

US 2023/0226796 A1 Jul. 20, 2023

(30) Foreign Application Priority Data

May 5, 2020 (IT) ........................ 102020000009898

(51) Int. Cl.
*B31F 1/28* (2006.01)

(52) U.S. Cl.
CPC .......... *B31F 1/2877* (2013.01); *B31F 1/2804* (2013.01); *B31F 1/2868* (2013.01)

(58) Field of Classification Search
CPC ..... B31F 1/2804; B31F 1/2868; B31F 1/2877
See application file for complete search history.

(56) References Cited

U.S. PATENT DOCUMENTS 2,638,962 A * 5/1953 Nitchie ................. B31F 1/2877 156/473
4,316,761 A * 2/1982 Hirakawa ............. B31F 1/2877 156/472

(Continued)

FOREIGN PATENT DOCUMENTS

EP 0136510 A1 4/1985
EP 0698752 B1 1/1999

(Continued)

*Primary Examiner* — Thomas M Wittenschlaeger
*Assistant Examiner* — David G Shutty
(74) *Attorney, Agent, or Firm* — Breiner & Breiner, L.L.C.

(57) ABSTRACT

The single facer includes a load-bearing frame for housing a first corrugating roller and a second corrugating roller, meshing with each other and mounted in the load-bearing frame. The single facer further includes a pivoting structure pivoted to the load-bearing frame about a pivoting axis and provided with a first guide roller and a second guide roller (35) pivotally supported for rotation on the pivoting structure. A continuous flexible member is guided about the guide rollers. Furthermore, provided for is a control system adapted to displace the pivoting structure to a working position, wherein the continuous flexible member is pressed against the second corrugating roller, and to a raised position, wherein the first guide roller and the second guide roller are spaced from the second corrugating roller.

11 Claims, 27 Drawing Sheets

(56) References Cited

U.S. PATENT DOCUMENTS

| | | | | |
|---|---|---|---|---|
| 4,527,686 | A * | 7/1985 | Satoh | B65G 39/16 474/123 |
| 5,150,514 | A * | 9/1992 | Seki | B21B 31/08 72/239 |
| 5,344,520 | A * | 9/1994 | Seki | B31F 1/2877 156/472 |
| 5,389,183 | A * | 2/1995 | Seki | B31F 1/2863 156/472 |
| 5,512,020 | A * | 4/1996 | Yasui | B31F 1/2877 474/151 |
| 5,518,457 | A * | 5/1996 | Seki | B32B 37/1027 474/102 |
| 5,951,817 | A * | 9/1999 | Thomas | B31F 1/2863 156/472 |
| 7,448,424 | B2 * | 11/2008 | Wu | B31F 1/2877 156/578 |
| 7,617,856 | B2 * | 11/2009 | Gnan | B31F 1/2868 483/30 |
| 8,127,816 | B2 * | 3/2012 | Gnan | D21F 11/12 156/473 |
| 8,376,014 | B2 * | 2/2013 | Wu | B31F 1/26 156/472 |
| 9,193,127 | B2 * | 11/2015 | Yamada | B31F 1/2868 |
| 9,545,769 | B2 * | 1/2017 | Schieder | B31F 1/2818 |
| 10,293,588 | B2 * | 5/2019 | Fischer | B31F 1/2877 |
| 10,457,010 | B2 * | 10/2019 | Schell | B31F 1/2804 |
| 11,034,122 | B2 * | 6/2021 | Ruhland | B31F 1/2831 |
| 11,235,549 | B2 * | 2/2022 | Nitta | B31F 1/2804 |
| 11,712,867 | B2 * | 8/2023 | Mizutani | B31F 1/2868 493/463 |
| 11,981,106 | B2 * | 5/2024 | Adami | B31F 1/2836 |
| 12,011,900 | B2 * | 6/2024 | Adami | B31F 1/2804 |
| 2007/0084565 | A1 | 4/2007 | Gnan | |
| 2008/0308233 | A1 | 12/2008 | Nitta | |
| 2014/0345804 | A1 | 11/2014 | Fischer et al. | |
| 2015/0122423 | A1 | 5/2015 | Schieder et al. | |
| 2020/0307142 | A1 * | 10/2020 | Adami | B31F 1/2863 |
| 2022/0105699 | A1 * | 4/2022 | Nitta | B31F 1/2868 |
| 2023/0226796 | A1 * | 7/2023 | Adami | B31F 1/2877 493/463 |

FOREIGN PATENT DOCUMENTS

| | | | |
|---|---|---|---|
| EP | 0850753 | B1 | 12/2000 |
| EP | 2792477 | A1 | 10/2014 |
| EP | 2805810 | B1 | 3/2016 |
| EP | 3556548 | A1 | 10/2019 |
| EP | 3599196 | A1 | 1/2020 |
| JP | 10709 | A | 6/1998 |
| JP | 10710 | A | 6/1998 |
| JP | 11105172 | | 4/1999 |
| JP | 2962660 | B2 | 10/1999 |
| JP | 200138830 | A | 2/2001 |
| JP | 2004276408 | A | 10/2004 |
| WO | 2017130631 | A1 | 8/2017 |
| WO | 2019187726 | A1 | 10/2019 |

* cited by examiner

SINGLE FACER FOR MANUFACTURING A CORRUGATED BOARD WITH A PRESSING UNIT WITH A CONTINUOUS FLEXIBLE MEMBER

TECHNICAL FIELD

The present invention relates to machines for manufacturing a corrugated board. More particularly, the invention relates to improvements to corrugators or so-called "single facers".

BACKGROUND ART

The corrugated board is manufactured starting from smooth paper webs, unwound from suitable reels. In the simplest form, the corrugated board consists of a smooth paper web and a corrugated paper web, glued together along the ridges of the waves of the corrugated paper web. Usually, to this basic structure there is added a second smooth paper web, glued to the corrugated paper web so that the latter is interposed between the two smooth paper webs, also called liners. In some cases, added to this structure consisting of three paper webs are others with a sequence of corrugated paper webs interposed between smooth paper webs.

The single face corrugated board is produced by a "single facer", comprising a pair of mutually meshing corrugating rollers, between which a first smooth paper web is supplied. The first smooth paper web is hot-deformed into the nip between the two corrugating rollers and it becomes a fluted paper web. An adhesive is applied on the ridges of the flutes of the fluted paper web adherent to one of the corrugating rollers and a smooth paper web is pressure- and heat-applied on the fluted paper web provided with an adhesive.

A pressing unit comprising at least one pressing member which is pressed against one of the corrugating rollers is provided for gluing the fluted paper web and the smooth paper web to each other. The smooth paper web and the fluted paper web pass between the corrugating roller and the pressing member.

In some single facers the pressing unit comprises a continuous flexible member, in the form of a belt, which is driven around guide rollers. Examples of single facers of this type are disclosed in U.S. Pat. No. 9,545,769, EP0698752, U.S. Pat. No. 10,293,588, US2015/0122423, U.S. Pat. No. 5,512,020, EP2805810, EP2792477, U.S. Pat. No. 5,951,817, US2014/0345804, EP0850753, JP10-710, JP2001-38830, JP10-709.

U.S. Pat. No. 2,638,962 discloses a corrugator comprising a pressing belt driven about two guide rollers, the first of which is rotatable about a fixed axis with respect to the load-bearing structure and the second is movable with a rotary movement about the fixed axis of the first roller. When the belt is moved away from the corrugating rollers, it presses against an outer cylinder that keeps the belt stretched.

JP11105172 discloses a corrugator with a pressing belt driven about three rollers. A complex system of actuators drives the movement of two belt guide rollers to control the traction of the belt and to keep the belt guided properly.

A further corrugator with a pressing belt and members for controlling the stretch and for guiding the belt is disclosed in JP2962660. Also in this case the belt is guided by a complex system of three guide rollers and relative actuators which control the movements thereof.

EP3556548 discloses a single facer with a mechanism for replacing the corrugating rollers. The single facer further comprises a pair of fixed-axis guide rollers, about which a pressing belt is driven. The pressing belt is raised when the corrugating rollers are removed from the single facer.

Given that they must withstand very high working temperatures and working tractions, continuous flexible members are complex, high-cost machine elements. They are subject to wear and must be replaced periodically. Replacement entails machine downtime. Replacement operations must be carried out cautiously and by trained personnel, so as to avoid damaging the new continuous flexible member which is mounted in place of the worn one.

Manufacturing corrugated boards of various types, which differ in shape and size of the flutes of the fluted paper web, requires the replacement of the corrugating rollers. In modern single facers, the two corrugating rollers meshing with each other are mounted in a cassette or cartridge so as to simplify this operation. Multiple cassettes or cartridges contain pairs of different corrugating rollers, for manufacturing different corrugated boards. Cartridge replacement is quick and simple. However, it can encounter an obstacle in the presence of the pressing unit. Replacing the corrugating rollers requires that those in the single facer must be moved away from the pressing member. This operation requires complex mechanical solutions. A single facer provided with a system for replacing the cartridges or cassettes of corrugating rollers is for example disclosed in US2007/0084565.

Furthermore, the use of continuous flexible members in the form of belts requires carefully controlling the traction thereof and the position thereof during the operation. This requires the use of complex control and guide systems.

Therefore, in the field there is continuous search for simpler and more efficient construction solutions aimed at facilitating and simplifying one or more of the aforementioned operations.

SUMMARY

According to an aspect, herein described is a single facer having a novel structure aimed at facilitating the replacement of the corrugating rollers.

The single facer comprises a load-bearing frame, i.e. a load-bearing structure, in which a first corrugating roller and a second corrugating roller, meshing with each other, can be mounted. For example, the corrugating rollers can be mounted in a rapidly replaceable cartridge or cassette. Furthermore, the single facer has a pivoting structure pivoted to the load-bearing frame about a pivoting axis. A first guide roller rotatably supported about a first rotation axis and a second guide roller rotatably supported about a second rotation axis are associated to the pivoting structure.

The first guide roller, the second guide roller and the pivoting structure are part of a pressing assembly or unit. A continuous flexible member is guided about the guide rollers. The continuous flexible member may consist of a belt. The continuous flexible member comprises a first branch, facing toward the second corrugating roller and defined between the first guide roller and the second guide roller. The continuous flexible member also comprises a second branch, opposite to the second corrugating roller.

The first guide roller and the second guide roller have rotation axes approximately parallel to each other and approximately parallel to the axes of the corrugating rollers. Furthermore, the rotation axes of the guide rollers and of the corrugating rollers are approximately parallel to the pivoting axis with which the pivoting structure is pivoted to the load-bearing frame. The parallelism between the aforementioned axes is not precise, in the sense that small deviations with respect to the parallelism can be provided for and controlled, for example so as to adjust the position of the continuous flexible member and the traction to which the continuous flexible member is subjected, as will be clear from the description outlined hereinafter.

The single facer further comprises a control system adapted to rotate the pivoting structure about the pivoting axis between the pivoting structure and the load-bearing frame. More in particular, the control system can displace the pivoting structure to a working position, wherein the continuous flexible member is pressed against the second corrugating roller, and to a raised position, wherein the first guide roller and the second guide roller are spaced from the second corrugating roller.

The pivoting axis between the pivoting structure and the load-bearing frame can be approximately coincident with the axis of one of the guide rollers. However, the pivoting axis is preferably spaced from both rotation axes of the guide rollers. This makes the system more efficient because it allows to better space the guide rollers from the underlying corrugating roller when the pivoting structure is raised.

In order to facilitate the replacement of the corrugating rollers and avoid or reduce the risk of accidental impacts between the corrugating rollers and the continuous flexible member, the single facer advantageously comprises a stretching device, adapted to stretch the continuous flexible member when the pivoting structure is in the raised position. The stretching device is adapted to stretch the branch of the continuous flexible member opposite to the corrugating rollers outwards, so that the branch of the continuous flexible member facing toward the corrugating rollers remains stretched between the guide rollers, and so that it does not protrude downwards due to the loosening effect.

This allows to prevent the lower branch, i.e. the branch facing toward the area of the corrugating rollers, of the continuous flexible member, from projecting into the area in which a new pair of corrugating rollers is to be inserted.

In some embodiments, one of the two guide rollers is suitably motor-driven. In other embodiments, both of the guide rollers may be idle. In both cases, it may be provided that the corrugating rollers have their own drive means. If the two guide rollers are both idle, i.e. not motor-driven, the corrugating rollers must have their own drive means, which also provides for driving the continuous flexible member.

In advantageous embodiments, the stretching device comprises a stretching bar, extending approximately parallel to the axes of the first guide roller and the second guide roller and carried by the pivoting structure pivoted to the load-bearing frame. The stretching bar is arranged between the first branch and the second branch of the continuous flexible member and is movable with respect to the first guide roller and the second guide roller to push the second branch of the continuous flexible member outwards, i.e. away from the guide rollers. In this manner, the first branch of the continuous flexible member is stretched between the first guide roller and the second guide roller when the pivoting structure is in the raised position and the continuous flexible member is spaced from the second corrugating roller.

The stretching bar can be actuated by special actuators, for example mounted on the pivoting structure. However, this is not necessary.

As a matter of fact, in particularly advantageous embodiments, with which a simpler, more cost-effective and more reliable structure is obtained, the stretching bar is activated by abutment members associated to the load-bearing frame. In this manner, the upward rotary movement of the pivoting structure in the direction away from the pair of corrugating rollers causes the stretching bar to co-act with the abutment members associated to the load-bearing frame, which constitute a sort of stop element, causing the stretching bar to move relative to the pivoting structure. This interaction between the abutment members and the stretching bar causes the traction of the first branch of the continuous flexible member.

In some embodiments, it may be provided that the stretching bar be supported by a pair of pivoting levers, hinged to the pivoting structure about an axis approximately parallel to the pivoting axis of the pivoting structure to the load-bearing frame. The pivoting levers are adapted to co-act with respective stationary abutments associated to the load-bearing frame, so that when the pivoting structure rotates from the working position toward the raised position, the pivoting levers come into contact with the stationary abutments and rotate with respect to the load-bearing structure, thus stretching the continuous flexible member. The abutments do not necessarily have to be rigidly connected to the load-bearing frame. For example, the abutments can be elastic, for a more gradual operation of the stretching bar and for damping the impacts between the abutments and the pivoting levers.

In possible embodiments the pivoting structure comprises a first pivoting arm and a second pivoting arm, rigidly connected to each other, for example by a beam approximately parallel to the rotation axes of the guide rollers. The first guide roller and the second guide roller are supported between the pivoting arms. At least one of the arms is pivoted to the load-bearing frame. Preferably, both arms are pivoted to the load-bearing frame. Actuators, for example linear actuators, for controlling the rising and the lowering movement of the pivoting structure and for pressing the continuous flexible member against the second corrugating roller are associated to one or to the other, or preferably to both pivoting arms.

If the corrugating rollers are mounted on a cassette, in advantageous embodiments the cassette and the load-bearing frame are configured so that, in working position, the cassette lies on support profiles of the load-bearing frame. In this manner, the thrust exerted by the pressing unit on the cassette contributes to make the position of the cassette of the corrugating rollers stable. Complex systems for the upward vertical thrust of the corrugating rollers against the pressing unit are not required, contrary to what is provided for in many single facers of the prior art.

Further advantageous features and embodiments of the single facer are described hereinafter and set out in the attached claims, which are an integral part of the present description.

According to a further aspect, further provided is a method for operating a single facer as outlined above. The following steps are carried out to replace the first corrugating roller and the second corrugating roller:

- raising the pivoting structure by moving the first guide roller and the second guide roller away from the first corrugating roller and the second corrugating roller;
- when the pivoting structure is in the raised position, keeping the continuous flexible member stretched by means of the stretching device;
- removing the first corrugating roller and the second corrugating roller from the load-bearing frame;
- inserting a new first corrugating roller and a new second corrugating roller into the load-bearing frame; and
- lowering the pivoting structure;
- pressing the continuous flexible member against the new second corrugating roller.

According to another aspect, disclosed herein is a single facer for manufacturing a single face corrugated board, comprising a load-bearing frame in which a first corrugating roller and a second corrugating roller can be mounted, meshing with each other and mounted in the load-bearing frame. The single facer further comprises a pressing unit adapted to press against the second corrugating roller. The pressing unit comprises a first guide roller rotatably supported about a first rotation axis and a second guide roller rotatably supported about a second rotation axis. A continuous flexible member is guided about the guide rollers.

Characteristically, the first guide roller and the second guide roller are supported by a pivoting structure, pivoted to the load-bearing frame about a pivoting axis, approximately parallel to the axis of the first corrugating roller and the second corrugating roller. A control system adapted to rotate the pivoting structure to a working position, wherein the continuous flexible member is pressed against the second corrugating roller, and to a raised position, wherein the first guide roller and the second guide roller are spaced from the second corrugating roller, is associated to the pivoting structure.

This single facer may comprise, in combination, other features described herein, and in particular one or more of the features outlined in the attached claims.

BRIEF DESCRIPTION OF THE DRAWINGS

The invention will be clearer from the description and the attached drawings, which illustrate embodiments by way of non-limiting examples. More particularly, in the drawings.

DETAILED DESCRIPTION

Figure 1:
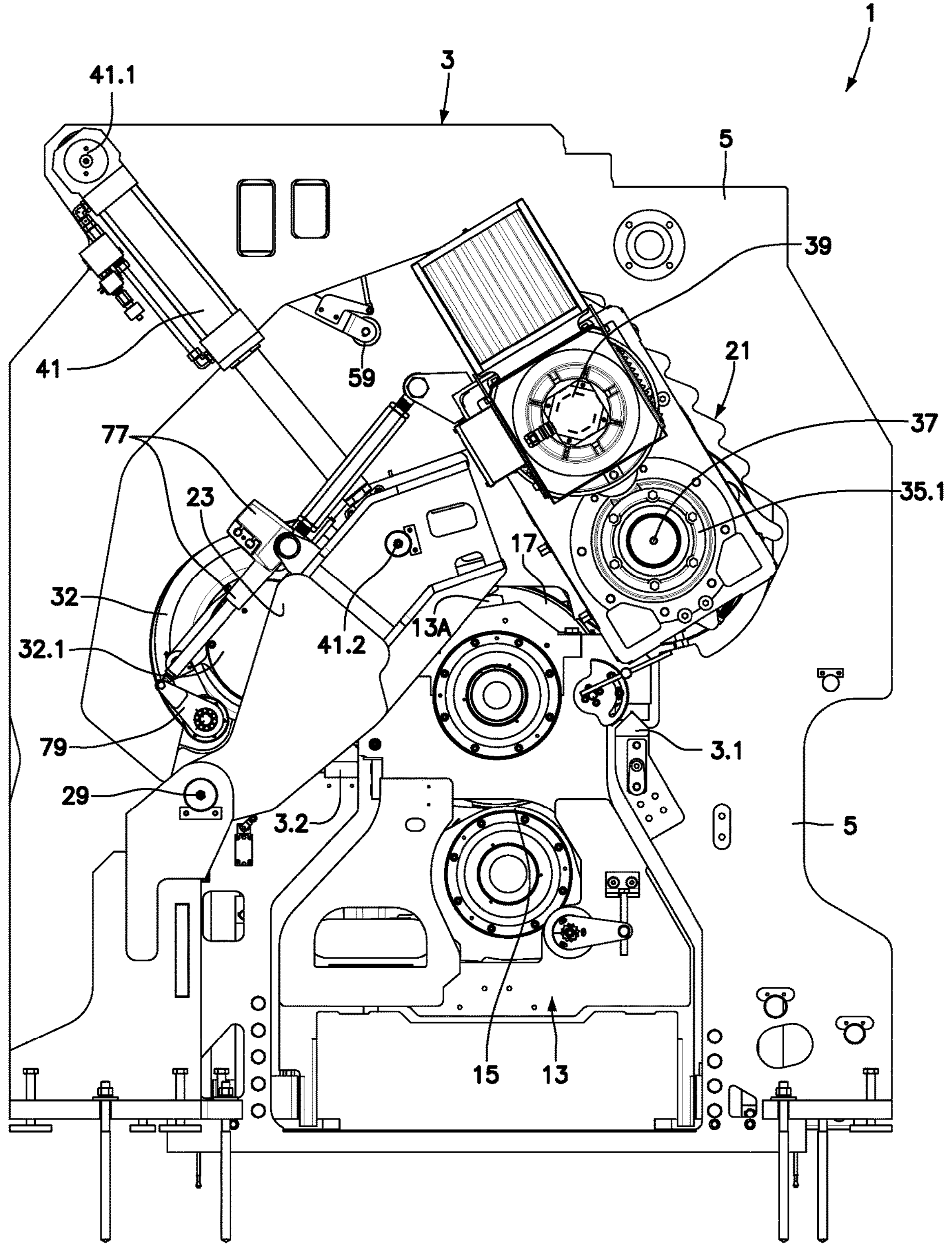
FIG. 1 shows a lateral view of the single facer in the working position.
Figure 2:
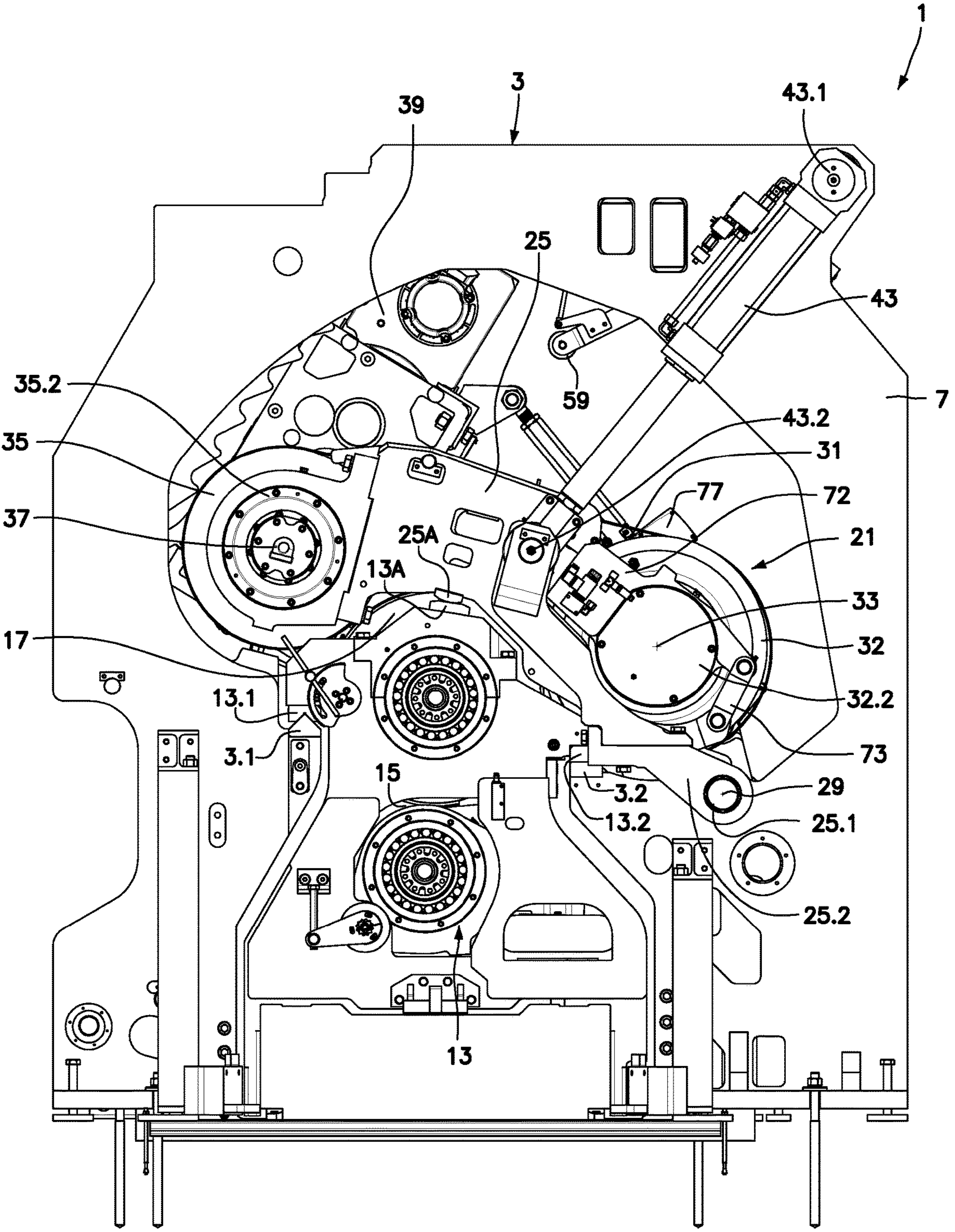
FIG. 2 shows a lateral view of the single facer of FIG. 1, from the opposite side with respect to FIG. 1.
Figure 2A:
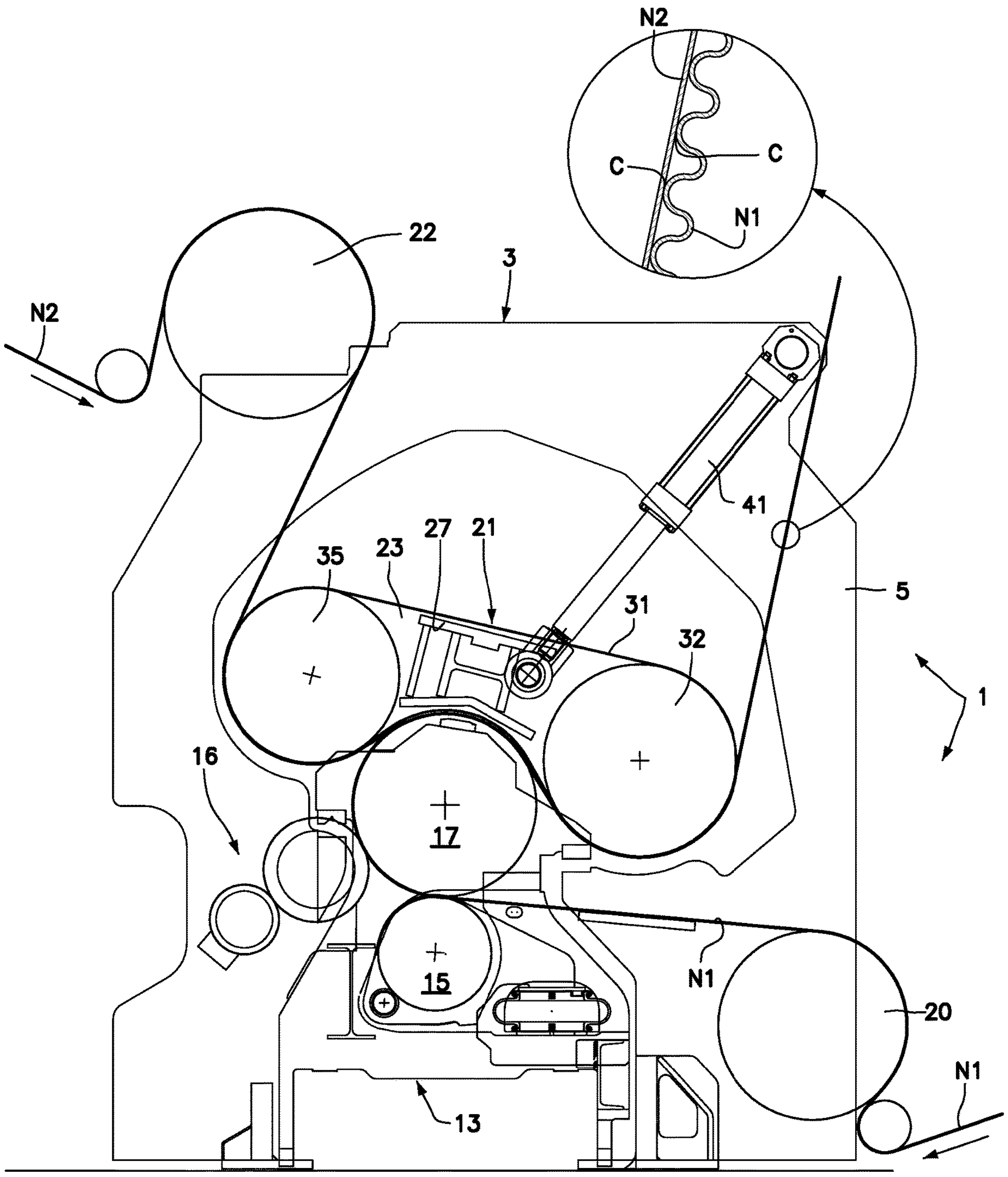
FIG. 2A shows a very simplified section of the single facer according to an intermediate vertical plane between the two sides.
Figure 2B:
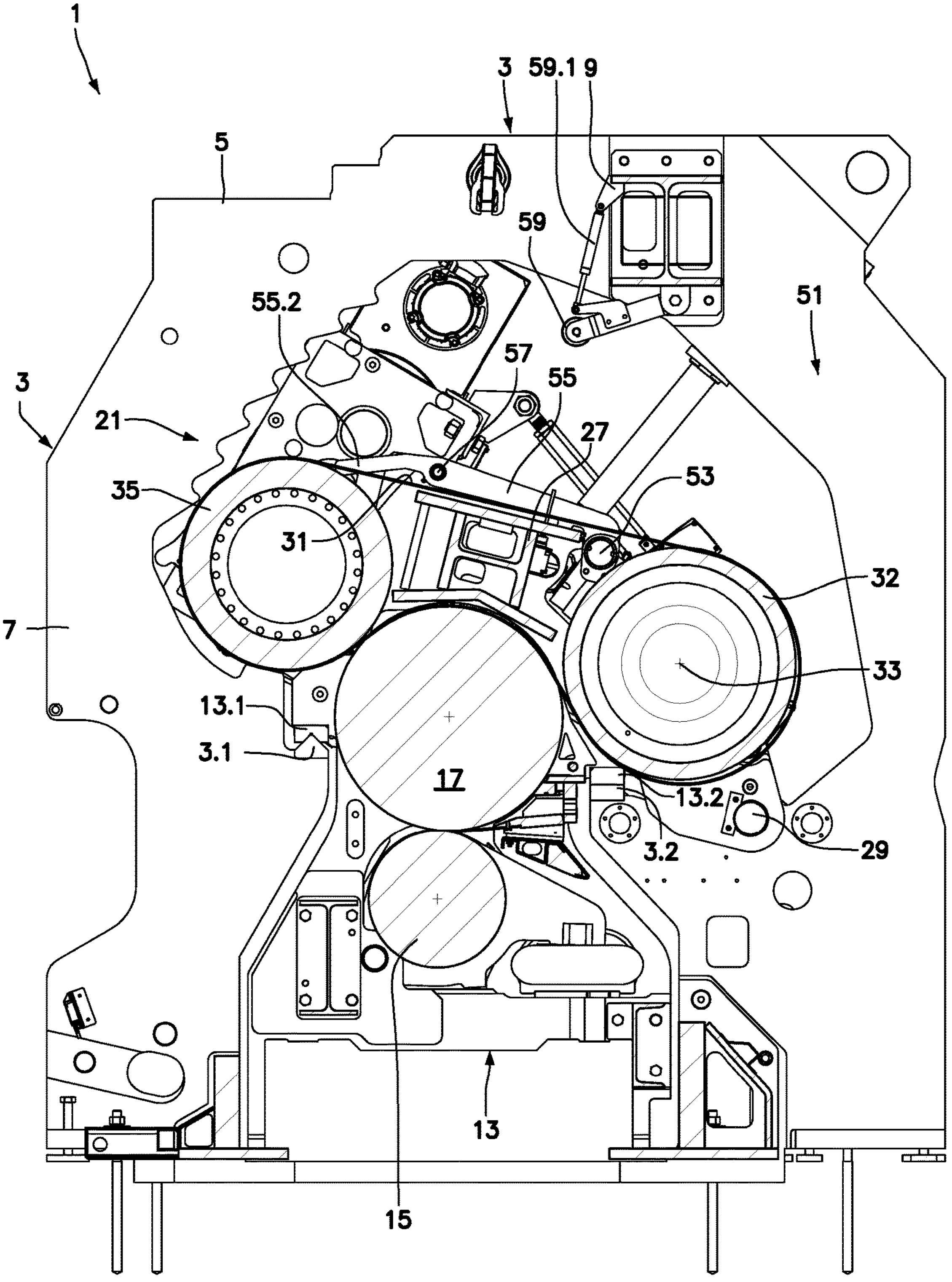
FIG. 2B shows a section of the single facer in the position shown in FIGS. 1 and 2, according to an intermediate vertical plane between the two sides.

The general structure of the single facer 1 may be understood from FIGS. 1, 2 and 2A, the first two of which show lateral views of the single facer from two opposite sides and FIG. 2A shows a very simplified section, according to an intermediate vertical plane between the two sides, in which only the main components of the single facer 1 are shown. FIG. 2B shows a section according to an intermediate vertical plane between the two sides of the single facer.

Figure 17:
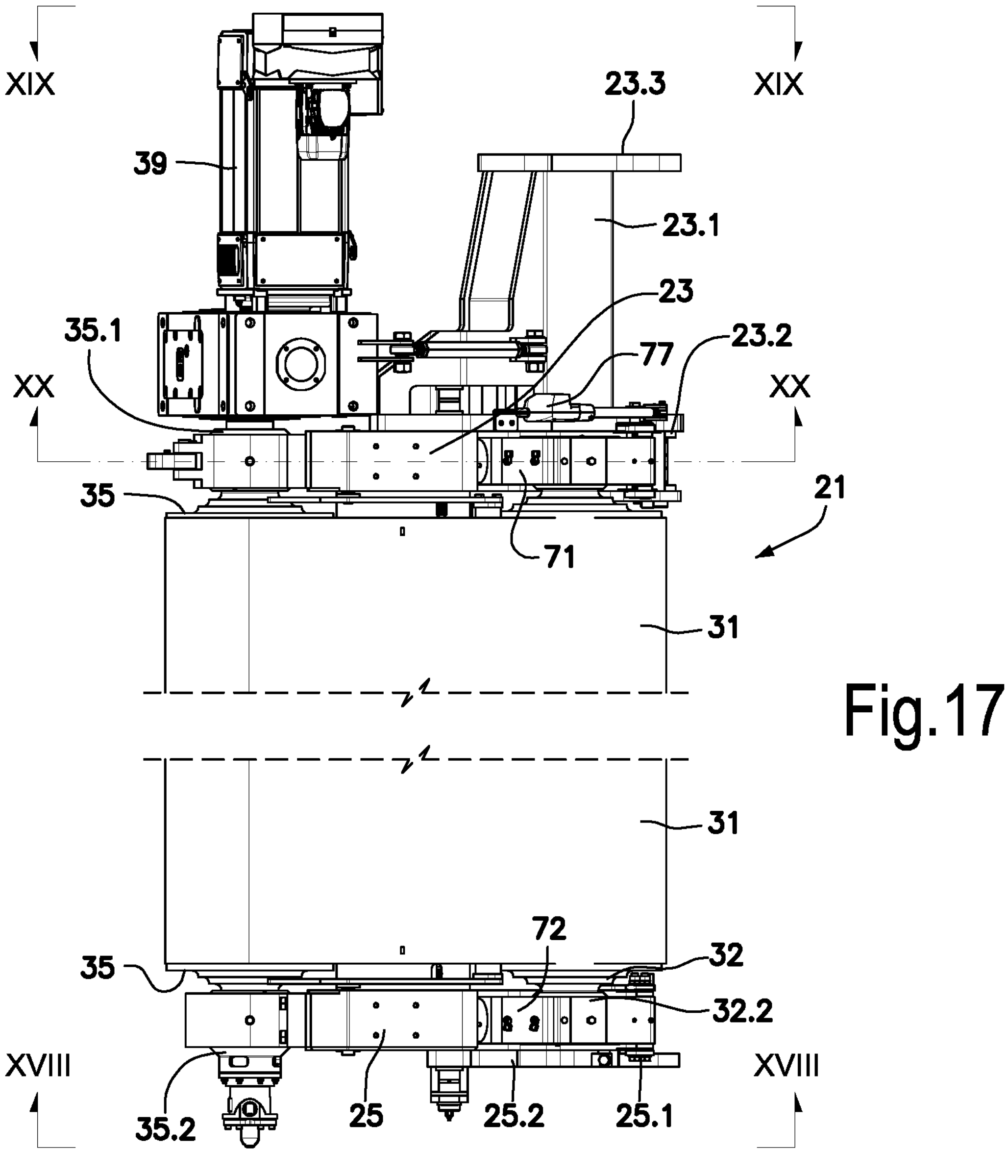
FIG. 17 shows a plan view of the pressing unit.
Figure 19:
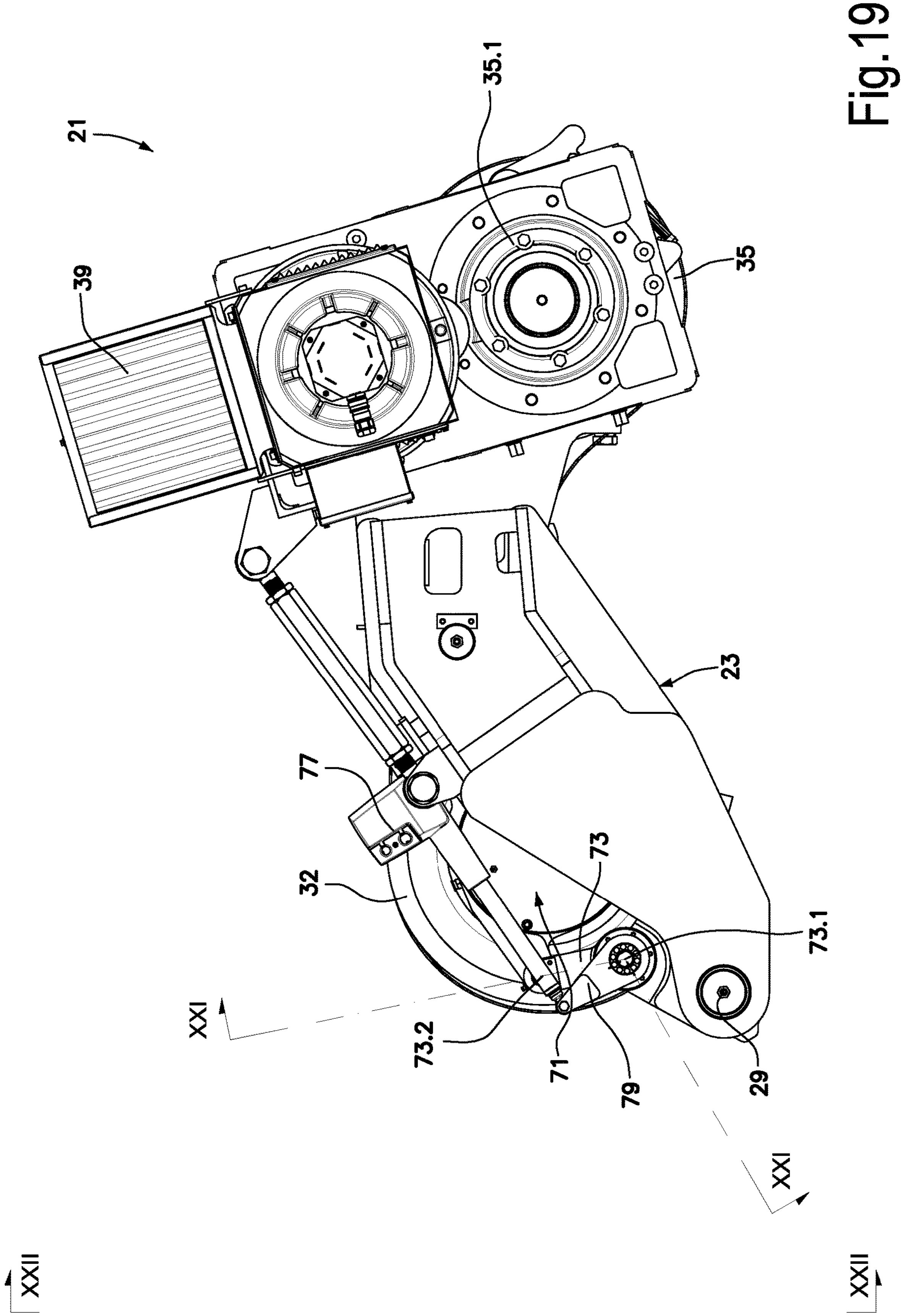
FIG. 19 shows a view according to XIX-XIX of FIG. 17.

The single facer 1 comprises a load-bearing frame 3, on which the corrugating rollers are supported, and a pressing unit which serves to press against each other the two paper webs which form a single face corrugated board sheet, not shown in the drawings. The load-bearing frame comprises a first side wall 5 on a first side of the single facer 1 and a second side wall 7 on a second side of the single facer 1; see also in particular FIGS. 14 and 17. The two side walls 5 and 7 are joined to each other by crosspieces 9, 11 shown in particular in FIGS. 13 and 14, where the corrugating rollers of the single facer 1 were removed. Generally, the first side is the one on which the drive means are located and the second side is the operator side, i.e. the side from which the operator usually has access to the single facer 1.

A cassette or cartridge 13 comprising a first corrugating roller 15 and a second corrugating roller 17 superimposed to the first corrugating roller is inserted into the load-bearing frame 3. The cartridge 13 is replaceable, i.e. interchangeable, to change the characteristics of the corrugated web manufactured by the single facer 1, using different corrugating rollers 15, 17.

The cassette 13 is supported in the load-bearing frame 3 of the single facer 1 by means of two shaped support profiles 13.1 and 13.2, which co-act with complementary support profiles 3.1 and 3.2 integrally joined with the load-bearing frame 3. The cassette is inserted into the single facer 1 on one side of the single facer 3, normally on the side defined by the second side wall 7. It cannot be ruled out that the insertion be carried out on the opposite side, or alternatively on both sides.

Advantageously, the cassette 13 is inserted into the load-bearing frame 3 and supported on the support profiles 3.1, 3.2 where it remains stationary due to the weight of the cassette and the corrugating rollers 15, 17 and due to the thrust of the pressing unit, to be described hereinafter.

The corrugating rollers 15, 17 are per se known and thus they are not described in detail. Each of them has a corrugated cylindrical surface and the two fluted cylindrical surfaces mesh with each other at a corrugation nip defined between the two corrugating rollers 15, 17, where a first smooth paper web passes, which is corrugated due to the pressure applied by the two corrugating rollers.

The first corrugating roller 15 co-acts with an adhesive applicator 16, shown only in the simplified section of FIG. 2A, and which applies an adhesive to the ridges of the flutes formed on the first paper web before a second smooth paper web is applied thereonto (while still adhering to the second corrugating roller 17). In order to make the two paper webs, respectively fluted and smooth, adhere, the single facer 1 comprises a pressing unit or assembly 21, arranged so as to act from the top downwards on the upper part of the second corrugating roller 17, about which the two paper webs are guided.

The pressing unit or assembly 21 comprises a pivoting structure, in turn comprising a first pivoting arm 23 on the first side of the load-bearing frame 3, and a second pivoting arm 25 on the second side of the load-bearing frame 3. The two pivoting arms 23, 25 can be rigidly connected to each other, for example by means of a beam 27. In the illustrated embodiment, both the pivoting arms 23, 25 are hinged to the load-bearing frame 3 about a pivoting axis 29, parallel to the axes of the corrugating rollers 15, 17 when the latter are mounted in the single facer 1.

The pressing unit or assembly 21 further comprises a continuous flexible member 31, for example a continuous belt. The continuous flexible member 31 is guided about a first guide roller 32, rotating about a first rotation axis 33, and about a second guide roller 35, rotating about a second rotation axis 37. The guide rollers 32, 35 and the respective rotation axes 33, 37, as well as the continuous flexible member 21 are shown in particular in the section of FIG. 5 and of FIG. 8.

The general operation of the single facer is easily understood from the simplified section of FIG. 2A. A first smooth paper web N1 is guided about a heated roller 20 and supplied into the corrugation nip between the first corrugating roller 15 and the second corrugating roller 17, where it is permanently deformed with the formation of flutes parallel to the rotation axes of the corrugating rollers 15, 17. The first paper web N1 remains adherent to the second corrugating roller 17 and receives, on the flutes thus formed, an adhesive applied by the adhesive applicator 16. Downstream of the adhesive applicator 16, the first corrugated web N1 is guided by the second corrugating roller 17 under the pressing unit 21 and more precisely between the corrugated surface of the second corrugating roller 17 and the continuous flexible member 31, which acts on the second corrugating roller 17. A second smooth paper web N2 is guided about a heated roller 22 and supplied between the first fluted web N1, adherent to the second corrugating roller 17, and the pressing unit 21, and more precisely under the continuous flexible member 31 of the pressing unit 21. The pressure exerted on the two webs N1, N2 in the nip between the pressing unit 21 and the second corrugating roller 17 causes the mutual adhesion of the webs N1, N2. At the outlet of the single facer 1 there is obtained a single face corrugated board web SF, whose structure is visible in the enlargement shown in FIG. 2A. The adhesive that joins the fluted web N1 to the smooth web N2 is indicated with C.

The first guide roller 32 and the second guide roller 35 define a first branch of the continuous flexible member 31, which consists in the portion of continuous flexible member 31 between the two guide rollers 32, 35 facing toward the second corrugating roller 17. The first branch of the continuous flexible member 31 constitutes the active branch, i.e. the one that is pressed against the second corrugating roller 17. A second branch, or return branch, of the continuous flexible member 31 is again defined between the guide rollers 32, 35 on the opposite side, i.e. facing opposite the second corrugating roller 17.

A gearmotor 39, which provides the rotary motion to the second guide roller 35 and therefore to the continuous flexible member 31, is mounted on the first pivoting arm 5, while the first guide roller 32 is mounted idle on the pivoting arms 23, 25.

In other embodiments, not shown, the gearmotor 39 is not provided and both the guide rollers 32 and 35 are mounted idle on the pivoting structure. In this case, the movement of the continuous flexible member can be provided via friction by the second corrugating roller 17.

The first pivoting arm 23 is constrained to a first linear actuator 41, for example a cylinder-piston actuator, preferably of the hydraulic type. One end 41.1 of the linear actuator 41 is pivoted to the load-bearing frame 3 and a second end 41.2 of the linear actuator 41 is pivoted to the first pivoting arm 25. Provided on the opposite side of the single facer 1 is a second linear actuator 43, which constrains the second pivoting arm 25 to the load-bearing frame 3. One end 43.1 of the linear actuator 43 is pivoted to the load-bearing frame 3 and a second end 43.2 of the linear actuator 43 is pivoted to the second pivoting arm 25. The two linear actuators 41, 43 control the pivoting movement of the pivoting structure, comprising the pivoting arms 23, 25 and the beam 27, about the pivoting axis 29 to carry out the operations that will be described hereinafter.

Further details of the pressing unit 21 will be described hereinafter. In particular, the following aspects will be described: details relating to the mutual connection between the pivoting arms 23, 25 and the load-bearing frame 3 and for facilitating the replacement of the continuous flexible member 31; details relating to a system for facilitating the replacement of the cassettes or cartridges; and details on a system for controlling the traction and keeping the continuous flexible member 31 guided. As will be clear from the present description, the features relating to these three functions of the single facer 1 are present combined in the illustrated embodiment. However, they may be used separately from each other. For example, the features which facilitate the replacement of the corrugating rollers can be used in a single facer 1, which has a different system for the replacement of the continuous flexible member and/or a different system for controlling the traction and keeping the continuous flexible member guided. Similarly, the features and elements for facilitating the replacement of the continuous flexible member can be used with a different system for facilitating the replacement of the corrugating rollers and/or with a different system for controlling the traction and keeping the continuous flexible member guided. Similarly, the latter can also be used in single facers with a different system for changing corrugating rollers and/or for replacing the continuous flexible member.

Before describing the aforementioned aspects more in detail, with reference to FIGS. 1 to 7, herein described are the movements carried out by the single facer 1, and more precisely by the pressing assembly or unit 21, for removing a cassette 13 of corrugating rollers 15, 17. FIGS. 1 and 2 show the side views of the first side and the second side of the single facer 1 with a cartridge or cassette 13 and the respective corrugating rollers 15, 17. The pressing unit 21 is in the working position, i.e. in a lower position. In this position, the continuous flexible member 31 is pressed against the upper part of the second corrugating roller 17, i.e. the corrugating roller arranged at a higher level in the cartridge 13 resting on the load-bearing frame 3. In the working position, the actuators 41, 43 push the pressing unit 21 downwards. In the illustrated embodiment, each of the pivoting arms 23, 25 have an abutment 23A and 25A. The two abutments 23A, 25A are arranged so as to co-act with abutments 13A carried by the cartridge 13. The abutments 23A, 25A are visible in particular in FIGS. 2, 4, 5, 7. One of the abutments 13A is visible in particular in FIG. 2.

When the single facer 1 is in the working position, the pivoting arms 23, 25 take an angular position defined by the resting of the abutments 23A, 25A on the abutments 13A of the cassette 13, which in turn rests on the support profiles 3.1, 3.2. The pressure exerted by the actuators 41, 43 keeps the pivoting arms 23, 25 in position and contributes towards keeping the cassette 13 of the corrugating rollers 15, 17 in the correct position.

Stretching actuators, to be described hereinafter, apply traction to the continuous flexible member 31 when the pressing unit 21 is in the working position, so as to keep the continuous flexible member 31 adherent to the paper webs (not shown) interposed between the continuous flexible member 31 and the second corrugating roller 17. The traction of the continuous flexible member reduces the thrust exerted by the actuators 41, 43 on the abutments 13A In order to replace the cassette 13, the pressing unit 21 is firstly rotated upwards, with a rotary movement about the pivoting axis 29. With this movement, the pressing unit 21 is brought to a raised position, spaced from the cassette 13. The lower branch of the continuous flexible member 31, i.e., the branch facing toward the second corrugating roller 17, is kept in traction between the first guide roller 32 and the second guide roller 35 with a mechanism which will be described hereinafter.

Figure 3:
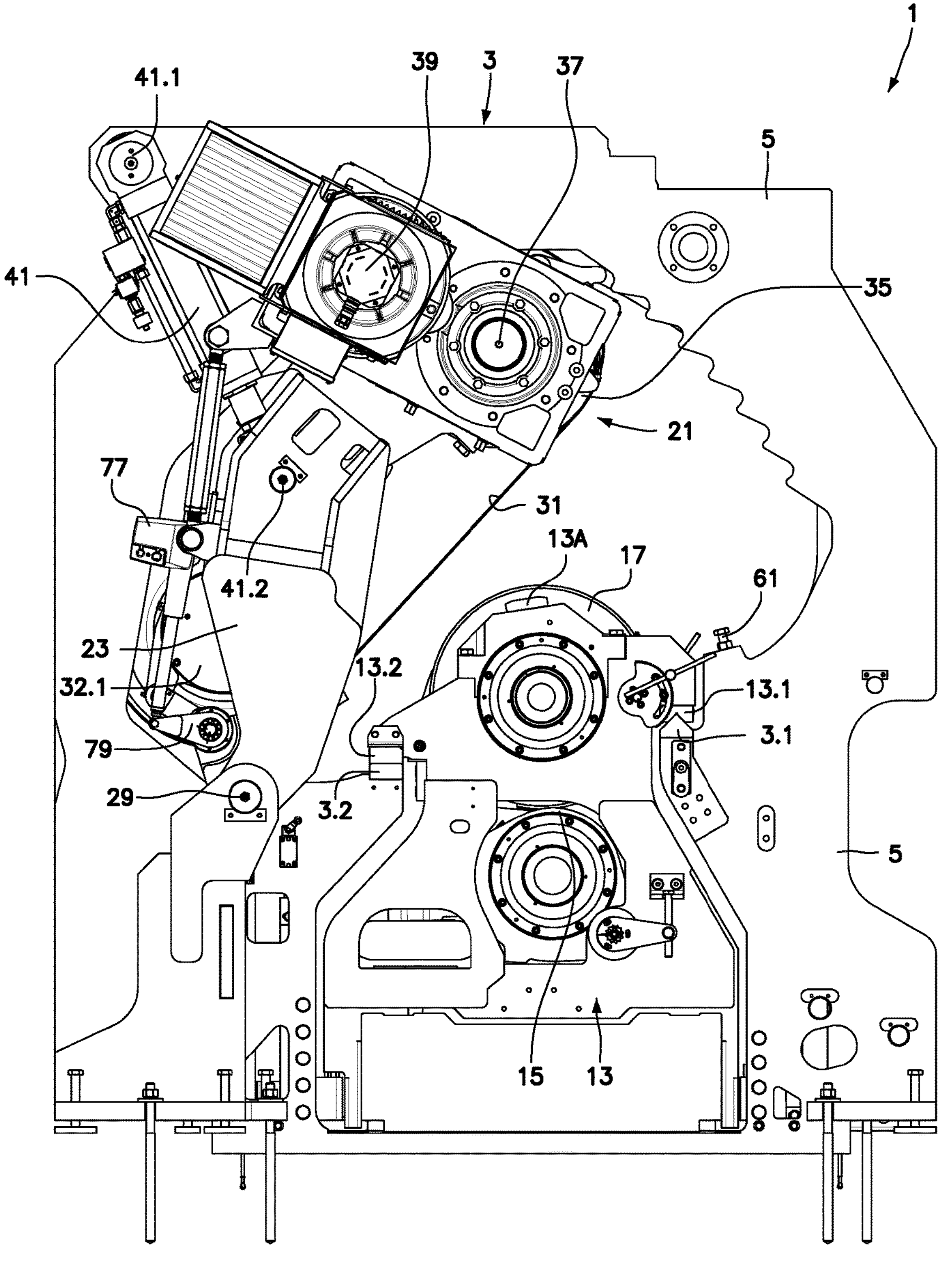
FIG. 3 shows a lateral view similar to FIG. 1, with the pressing unit raised.
Figure 5:
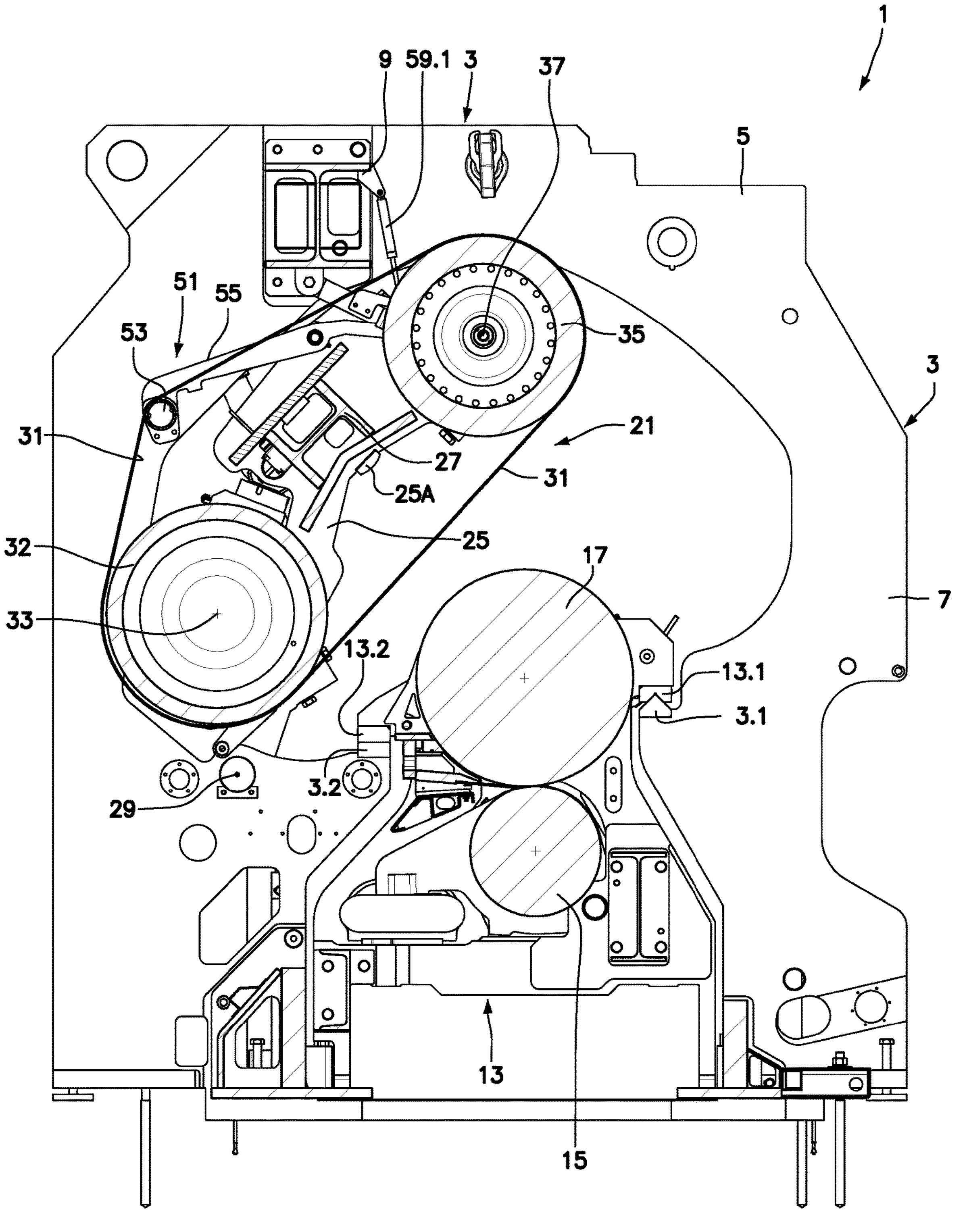
FIG. 5 shows a section of the single facer in the position shown in FIGS. 3 and 4, according to an intermediate vertical plane between the two sides of the single facer.

The raised position of the pressing unit 21 and thus of the pivoting structure and of the guide rollers 32, 35 carried thereon is represented in the two side views of FIG. 3 (first side of the single facer 1) and 4 (second side of the single facer 1), and in the section of FIG. 5.

Arranging the pivoting axis 29 of the pivoting structure at a distance from both of the rotation axes 33, 37 of the first guide roller 32 and of the second guide roller 35, allows to obtain a greater spacing between the guide rollers and the second corrugating roller 17, thus facilitating the removal of the cassette 13.

Providing the pressing unit 21 with a raising and lowering movement about the pivoting axis 29, allows to obtain an extremely simple and reliable system for carrying out the various operations required by the single facer, and in particular: keeping the continuous flexible member 31 under pressure against the second corrugating roller 17 during the production of corrugated board; the operations of replacing the cassette 13; the operations of replacing the continuous flexible member 31.

Figure 6:
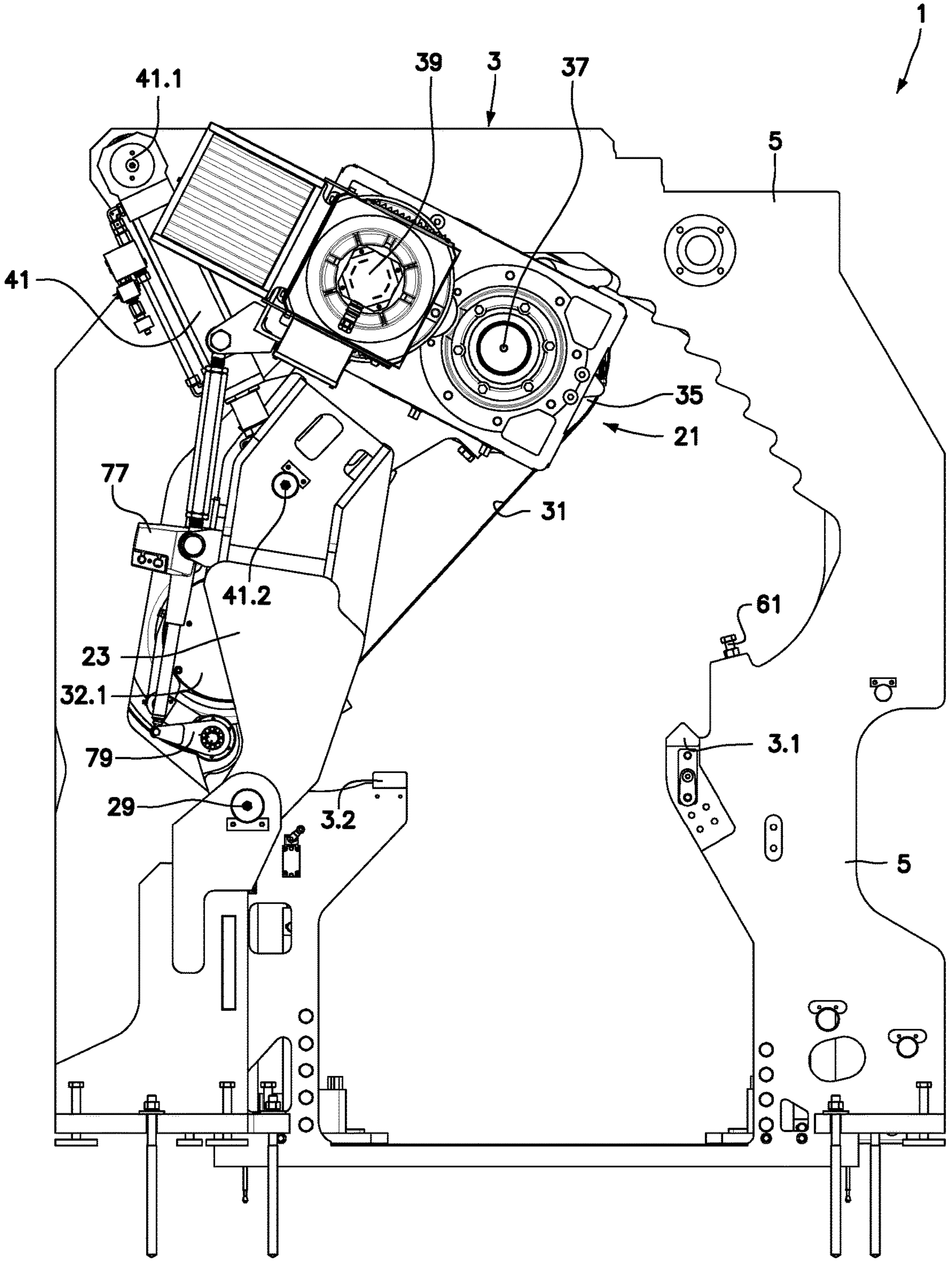
FIG. 6 shows a view similar to FIG. 3 with the cassette of the corrugating rollers removed.
Figure 7:
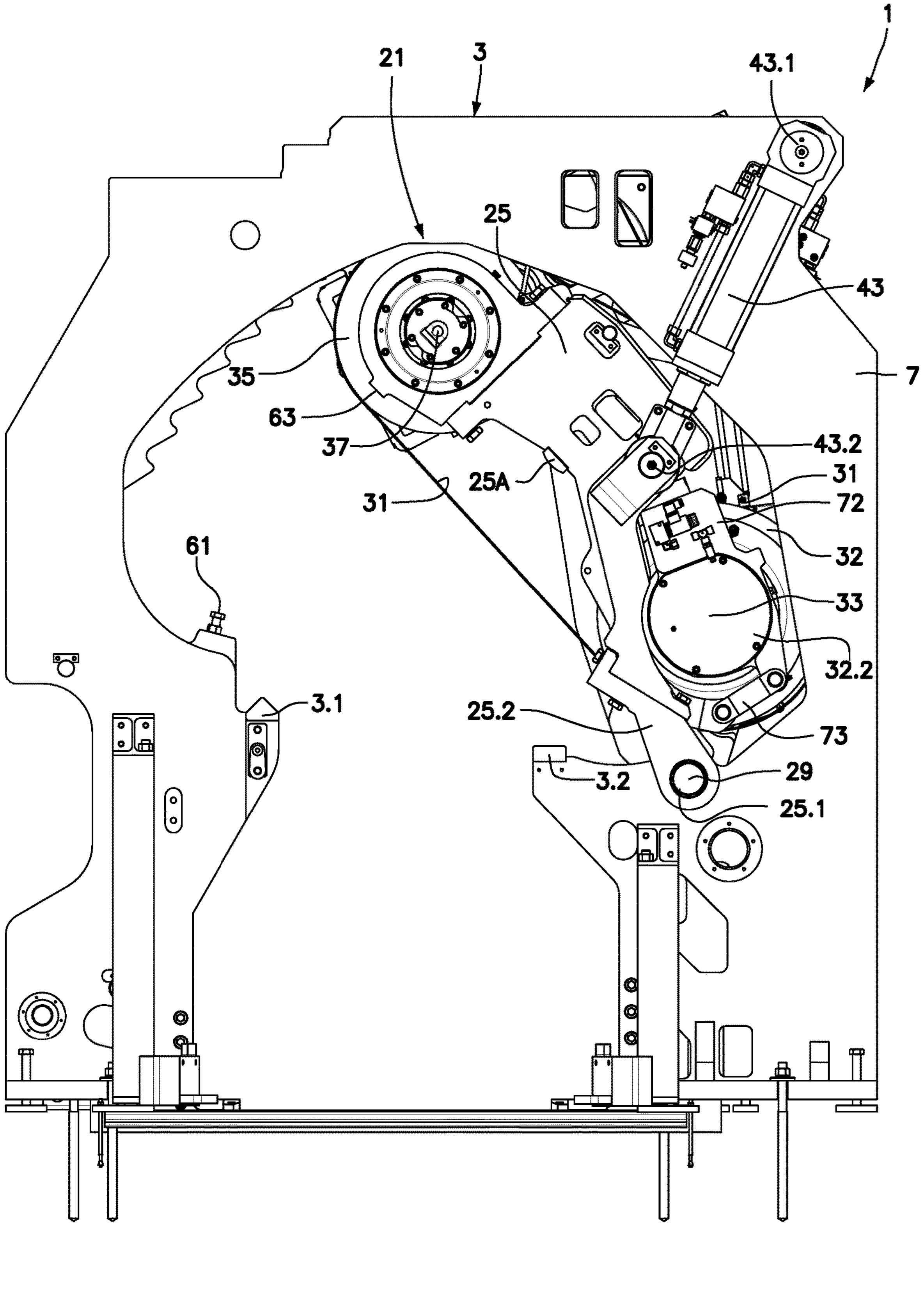
FIG. 7 shows a view similar to FIG. 4 with the cassette of the corrugating rollers removed.
Figure 8:
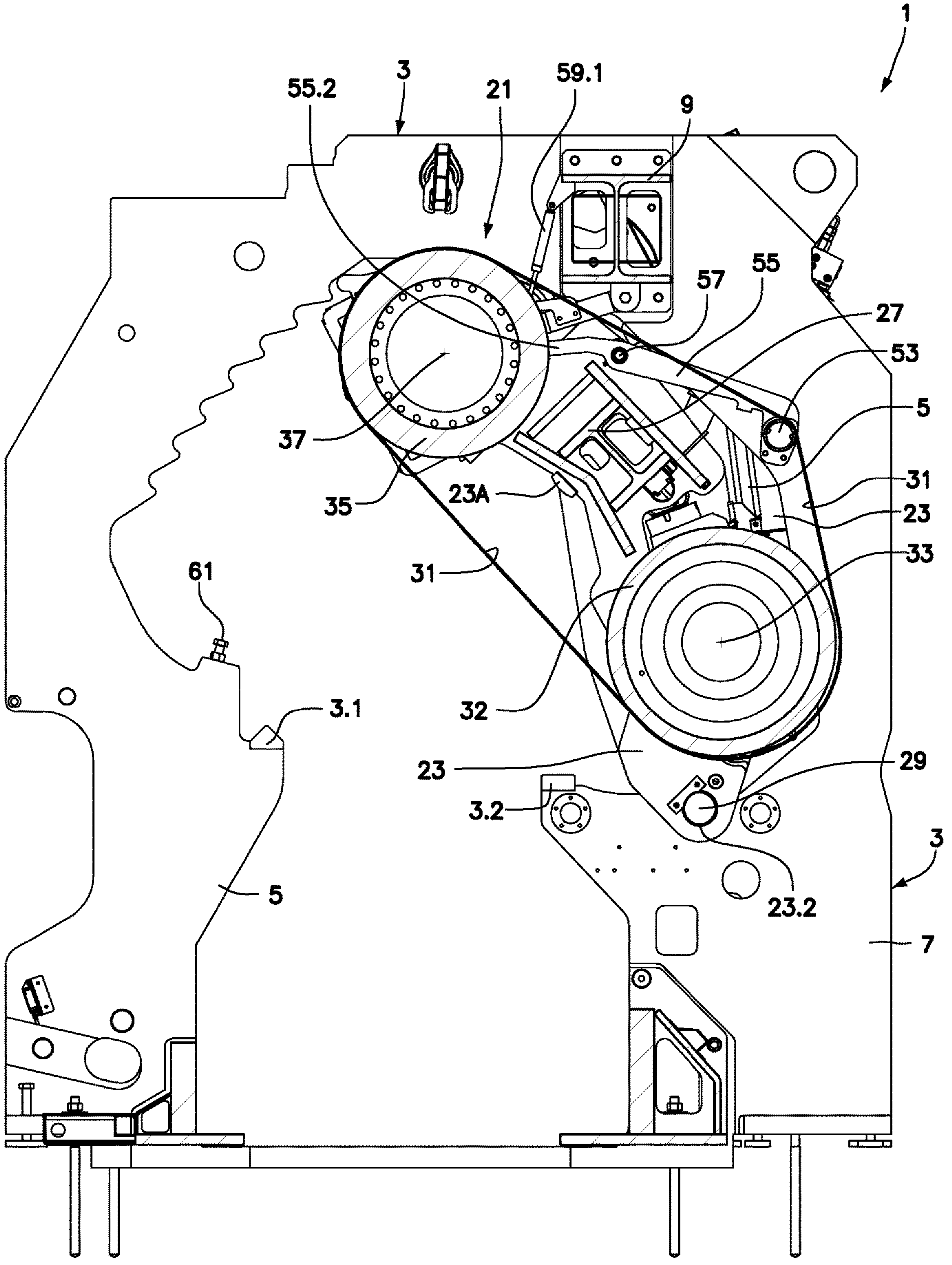
FIG. 8 shows a section according to an intermediate vertical plane of the single facer of FIG. 7.

When the pivoting structure is in the raised position, the cassette 13 can be raised from the support profiles 3.1 and 3.2 and can be removed from the single facer 1. In the illustrated embodiment, the cassette 13 may preferably be removed by extracting it from the second side of the single facer 1, but removing it from the first side of the single facer 1 cannot be ruled out. FIGS. 6, 7 and 8 show the side views and the section of the single facer 1 after removing the cassette 13.

After removing the cassette 13, it may be replaced by another cassette 13 having different corrugating rollers 15, 17, so as to manufacture another type of corrugated board.

As clearly shown in FIGS. 1, 2 and 3, when the pivoting structure, comprising the first pivoting arm 23, the second arm 25 and the beam 27, is moved away from the second corrugating roller 17, the continuous flexible member 31 tends to loosen, and the first branch thereof, facing toward the second corrugating roller 17, tends to rest on the second corrugating roller 17. Upon removing the cassette 13, the first branch (lower branch) of the continuous flexible member 31 would hang downwards, at least partly occupying the space in which a new cassette 13 is to be inserted. This could potentially damage the continuous flexible member 31 if the operator who inserts the new cassette 13 does not pay adequate attention and does not care to manually raise the first branch of the continuous flexible member 31.

Given that it is designed to withstand extreme working conditions, both in terms of traction and in terms of operating temperature, the continuous flexible member 31 is a very expensive machine element. As a matter of fact, the corrugating rollers are heated so as to accelerate the mutual gluing between the paper webs which form the corrugated board and the traction to which the continuous flexible member 31 is subjected is very high so as to generate a high pressure against the second corrugating roller 17, again to accelerate gluing of the paper webs that form the corrugated board.

Figure 9:
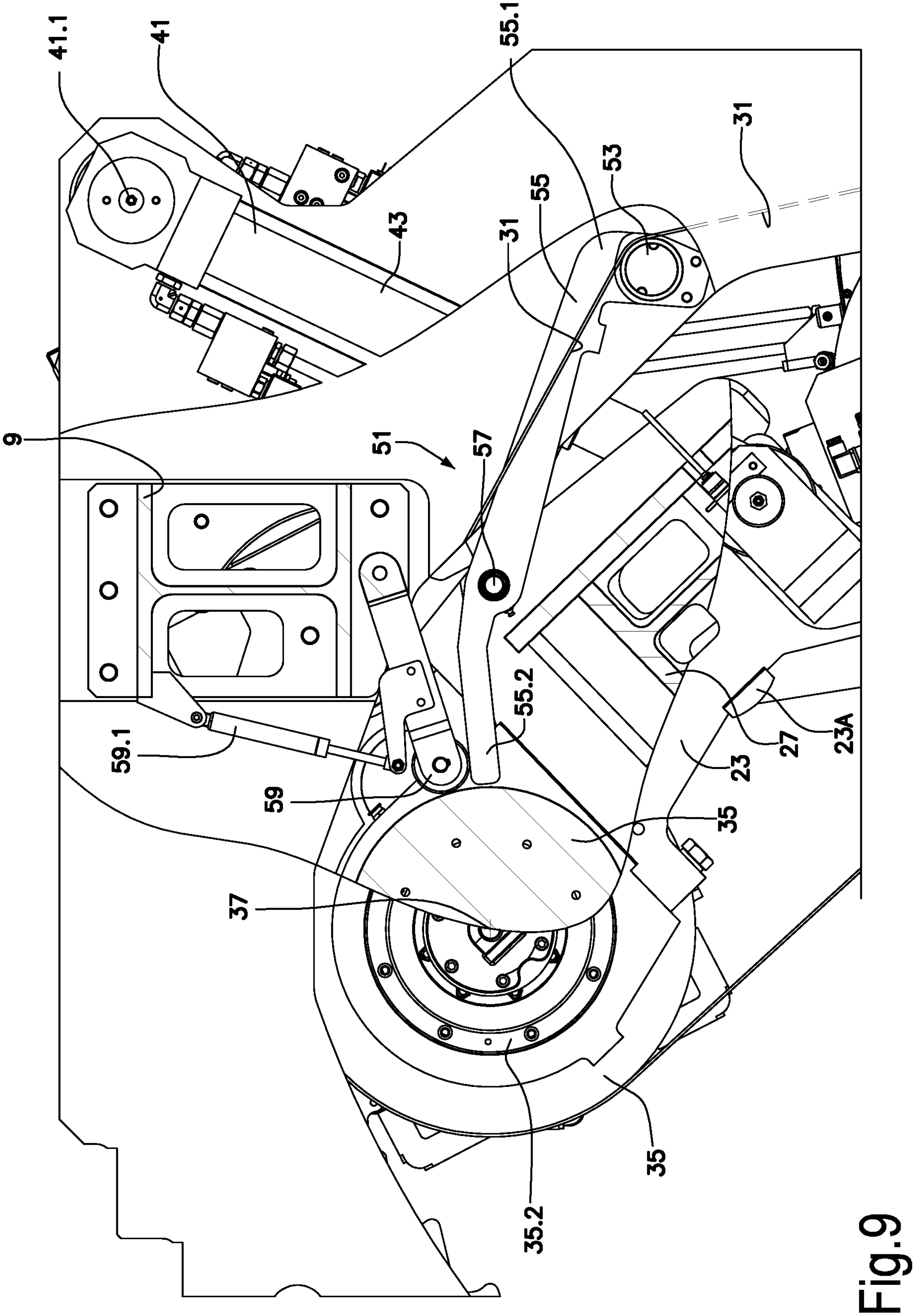
FIG. 9 shows an enlargement of a detail of FIG. 8 with parts removed.

In the illustrated embodiment, in order to avoid the risk of damaging the continuous flexible member 31 during the replacement of a cartridge 13, the pressing unit or assembly 21 comprises a stretching device, indicated in its entirety with 51 and visible in particular in FIGS. 8 and 9.

In the illustrated embodiment, the stretching device 51 comprises a stretching bar 53, which is arranged in the closed path defined by the continuous flexible member 31. The stretching bar 53 extends approximately parallel to the pivoting axis 29 and it is carried by the pivoting structure. Therefore, the stretching bar participates in the pivoting movement of the pivoting structure about the pivoting axis 29. When the pressing unit 21 is in the working position, the stretching bar 53 is in the non-operative position and preferably it is not in contact with the continuous flexible member 31, or in any case it does not apply any considerable force thereto. To this end, the stretching bar 53 can be housed in the space between the first guide roller 32 and the second guide roller 35.

When the pivoting structure is raised from the working position (FIGS. 1, 2) to the raised position (FIGS. 3, 4, 5), the stretching bar 53 rises together with the pivoting structure and at the same time it performs a movement with respect to the first guide roller 32 and the second guiding roller 35, so as to push from inside against the second branch of the continuous flexible member 31, facing the side opposite the second corrugating roller 17. FIGS. 8 and 9 show the final position that the stretching bar 53 takes once the pivoting structure is brought to the fully raised position thereof. The stretching bar 53 of the stretching device 51 pushes the return branch of the continuous flexible member 31 outwards, deforming it and preventing the first branch of such flexible member, facing toward the second corrugating roller 17, from loosening. Basically, the first branch of the continuous flexible member 31 remains stretched between the first guide roller 32 and the second guide roller 35. The traction exerted on the continuous flexible member 31 is negligible. It is sufficient that it avoids the downward slackening of the first branch of the continuous flexible member 31.

In some embodiments, not shown, the movement of the stretching bar may be driven by an actuator carried by the pivoting structure comprising the pivoting arms 23, 25 and the beam 27. However, in order to obtain a safer operation, and at the same time a greater construction simplicity and thus a lower cost, it is advantageous to provide that the stretching device 51 be passively activated when the pivoting structure is brought to the raised position.

To this end, the stretching bar 53 is carried by a mechanism which co-acts with stationary elements integrally constrained to the load-bearing frame 3, which, as a result of this cooperation, cause the movement of the stretching bar 53 with respect to the pivoting structure 23, 25, 27.

In the illustrated embodiment, the stretching bar 53 is carried by two pivoting levers 55, each associated with a respective pivoting arm 23, 25. The two pivoting levers 55 (only one of which is visible in FIGS. 8 and 9) are hinged about a pivoting axis 57 integrally joined with the pivoting arms 23, 25 and substantially parallel to the pivoting axis 29. Each pivoting lever 55 has a first end 55.1 constrained to the stretching bar 53 and a second end 55.2 arranged in proximity of the second guide roller 35. The second end of each pivoting lever 55 forms a movable abutment which co-acts with a respective abutment 59 mounted on the load-bearing frame 3. Each abutment 59 can be fixed or almost fixed, for example it can be an elastic abutment for dampening the impact of the end 55.2 of the pivoting lever 55. An elastic member 59.1, for example a pneumatic spring, can gradually contract while the pivoting arms 23, 25 reach the maximum raising position. The contraction of the elastic member 59.1 allows the respective abutment 59 to pivot upwards under the thrust of the end 55.2 of the respective pivoting lever 55, while the pivoting point of the latter (axis 57) follows the raising movement of the pivoting structure 23, 25, 27 (see FIG. 9). The elasticity provided by each of the two elastic members 59.1 allows to compensate for any extensions or contractions of the continuous flexible member 31, ensuring that it is always sufficiently stretched by the stretching bar 53.

As shown in FIG. 9, when the pivoting structure comprising the pivoting arms 23, 25 and the beam 27, with the stretching bar 53 rotatably supported thereon, rises until it reaches the position of maximum distance from the second corrugating roller 27, the stretching bar rotates about the axis 57 as a result of the co-action of the ends 55.2 of the pivoting levers 55 with the abutments 59. Thus, the stretching bar 53 pushes the second branch of the continuous flexible member 31, stretching the first branch of the continuous flexible member, thus preventing it from tending to slacken downwards thus entering into the area for moving the cartridge 13 of the corrugating rollers 15, 17. Basically, as clearly shown in FIGS. 5 and 8, when the pivoting structure is in the raised position, the continuous flexible member 31 is stretched between the two guide rollers 32, 35 and the stretching bar 53. This makes the cassette 13 easier to move and without the risk of damaging the continuous flexible member 31.

In some embodiments, the single facer 1 may comprise means for facilitating the replacement of the continuous flexible member 31. As a matter of fact, this member is subject to wear due to the high thermal and mechanical stresses to which it is subjected.

In order to facilitate the replacement of the continuous flexible member 31, the pivoting structure comprising the pivoting arms 23, 25 and the beam 27 is constrained to the load-bearing frame 3 so as to be able to support the guide rollers 32, 35, in a cantilevered fashion, on one of the two pivoting arms and allow the removal of the continuous flexible member 31 from the other side of the pivoting arm. In the illustrated example, as will be described in greater detail hereinafter, the first pivoting arm 23 is constrained to the load-bearing frame 3 so as to be able to support—in a cantilevered fashion—the first guide roller 32, the second guide roller 35 and the second pivoting arm 25, which can be temporarily disengaged from the load-bearing frame 3 so as to allow the removal and replacement of the continuous flexible member 31 from the side of the second pivoting arm 25.

Figure 13:
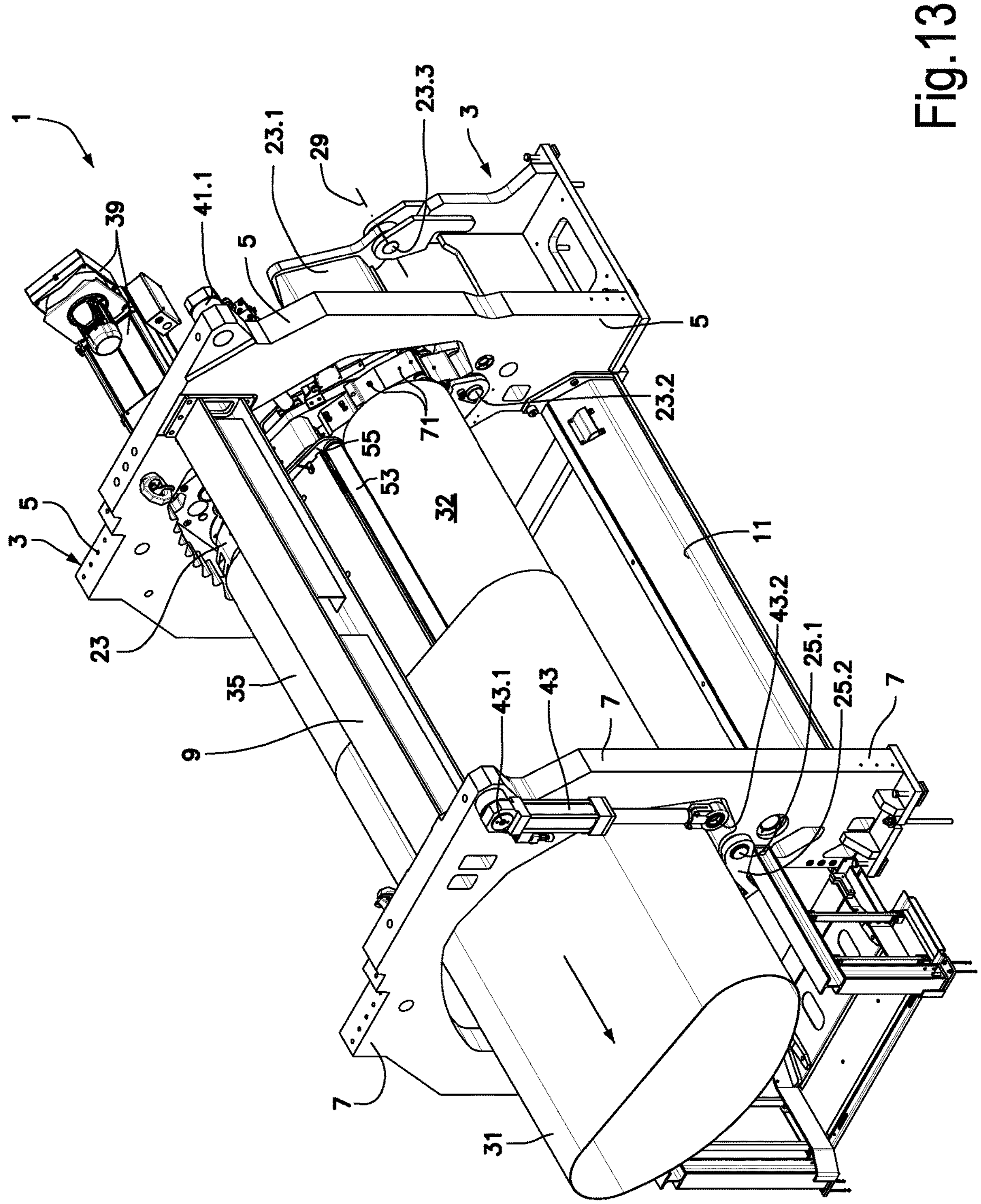
FIG. 13 shows an axonometric view of the single facer in the position of FIG. 12, with the continuous flexible member partially extracted from the guide rollers.
Figure 14:
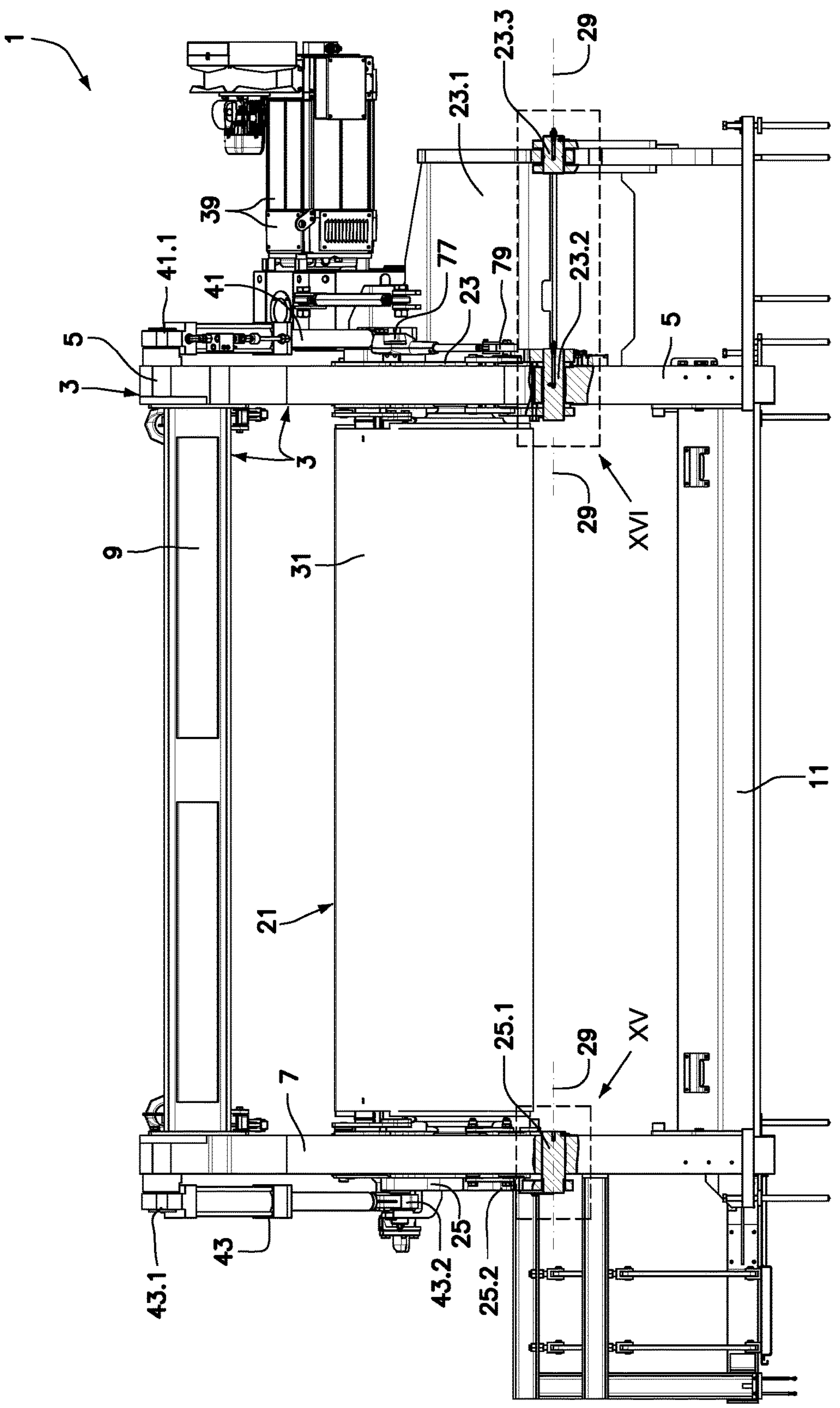
FIG. 14 shows a view of the single facer according to the line XIV-XIV of FIG. 13.
Figure 16:
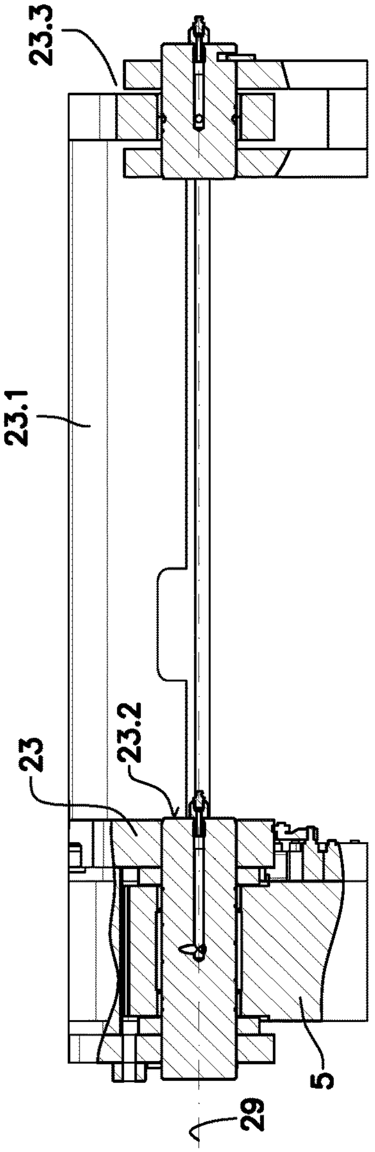
FIGS. 15 and 16 enlargements of the details indicated with XV and XVI in FIG. 14.
Figure 15:
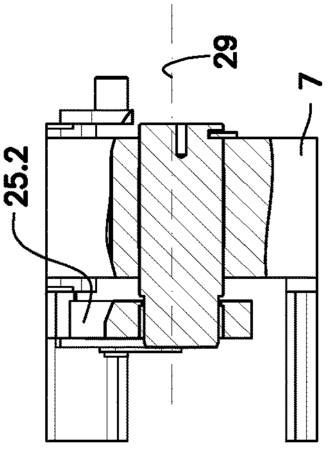
Figure 23:
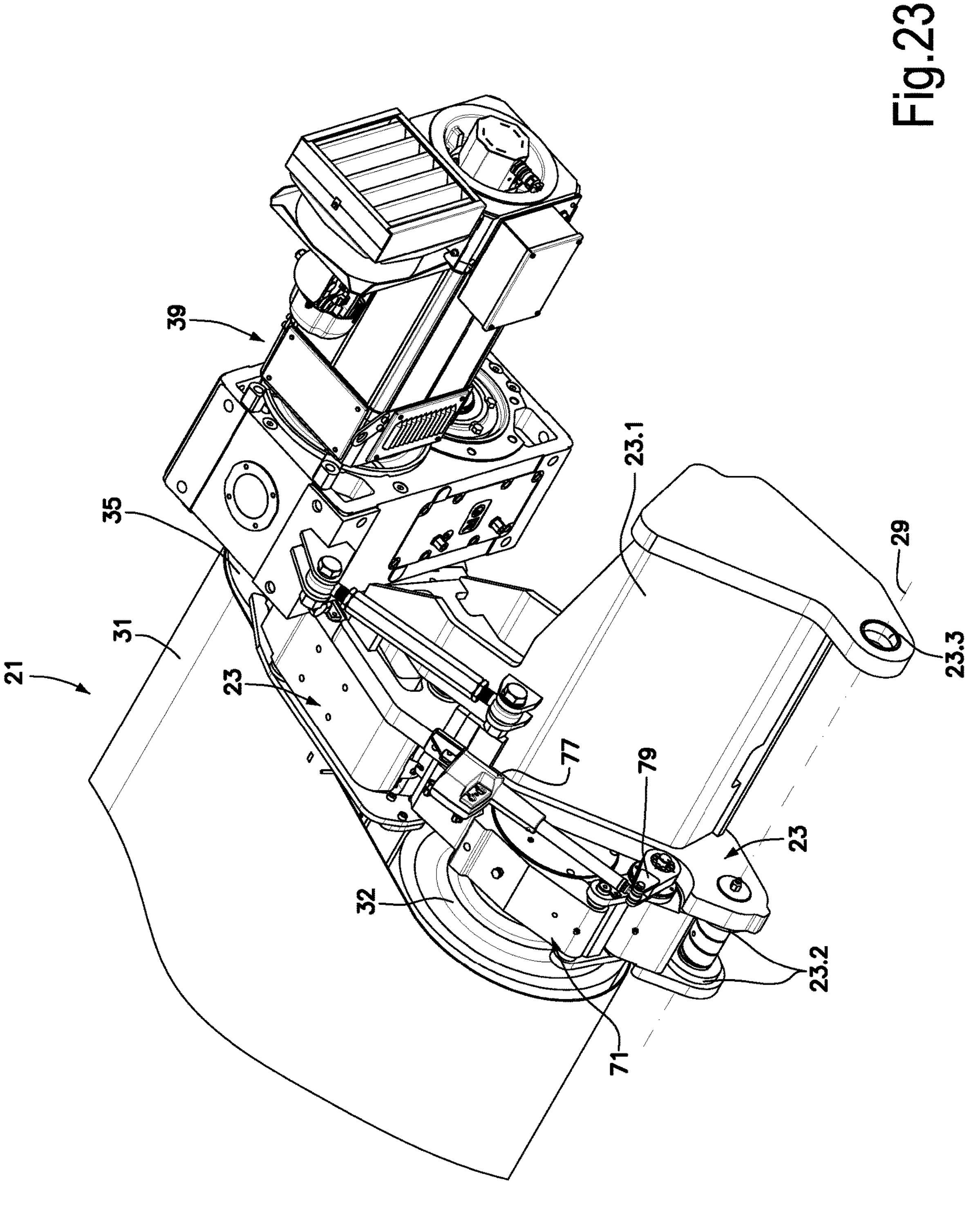
FIG. 23 shows a partial axonometric view of the pressing unit, on the side on which the motor for actuating the continuous flexible member is mounted.

With particular reference to FIGS. 13, 14 and 23, the first pivoting arm 23 comprises a beam 23.3 rigidly connected to the pivoting arm 23 and extending, in a cantilevered fashion, approximately parallel to the pivoting axis 29. The pivoting arm 23 with the respective beam 23.1 define two hinges 23.2 and 23.3 (see in particular FIG. 23), coaxial to each other and spaced along the direction of the pivoting axis 29. The two hinges 23.2 and 23.3 form the elements for constraining the pivoting arm 23 to the load-bearing frame 3 on the side of the side wall 5.

The two mutually spaced hinges 23.2, 23.3 provide a constraint to the first pivoting arm 23. The arm 25 is also held—in a cantilevered fashion—by means of the beam 27, which connects the pivoting arms 23, 25 to each other. Lastly, the guide rollers 32, 35 are supported, together with the pivoting arms 23, 25, by the hinge system 23.2, 23.3, which connects the pivoting arm 23 to the load-bearing frame 3. In this manner, the pivoting arm 25 can be detached from the load-bearing frame 3, allowing easy replacement of the continuous flexible member 31, as described hereinafter.

In the illustrated embodiment, the second pivoting arm 25 is constrained and pivoted to the load-bearing frame 3 by means of a hinge 25.1, shown in particular in FIG. 14. The second pivoting arm 25 is provided with a removable bracket 25.2 which connects the pivoting arm 25 to the hinge 25.1, see in particular the side views of the second side of the single facer 1 (FIGS. 2, 4, 7, 11, 12). The function of the bracket 25.2 will be clarified with reference to the sequence of operations for removing a worn continuous flexible member 31. These operations are illustrated in detail in FIGS. 7, 8, and 10 to 13.

FIGS. 7 and 8 show the single facer 1, from which the cassette 13 has been removed, a preliminary operation required to clear the space needed to replace the continuous flexible member 31.

From the position of FIGS. 7, 8, the pivoting structure, comprising the pivoting arms 23, 25 and the beam 27 with the two guide rollers 32, 35, is lowered by rotating about the pivoting axis 29, until it reaches a position lower than the normal working position, i.e., lower than the position in which the abutments 23A, 25A of the pivoting arms 23 25 rest on the abutments 13A of the cassette 13 which is located in the single facer 1.

Figure 10:
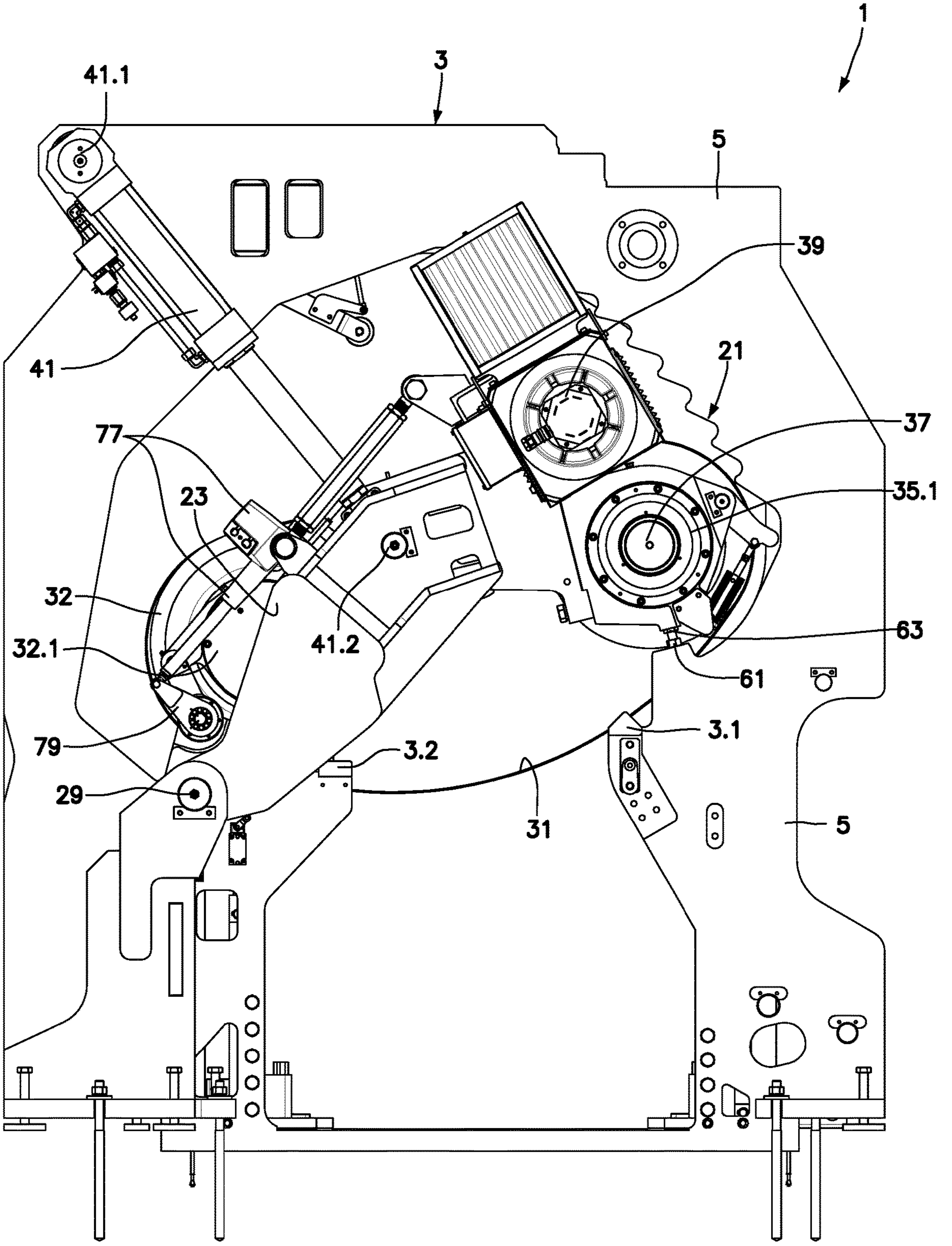
FIG. 10 shows a lateral view similar to the view of FIG. 6, with the pressing unit lowered.
Figure 11:
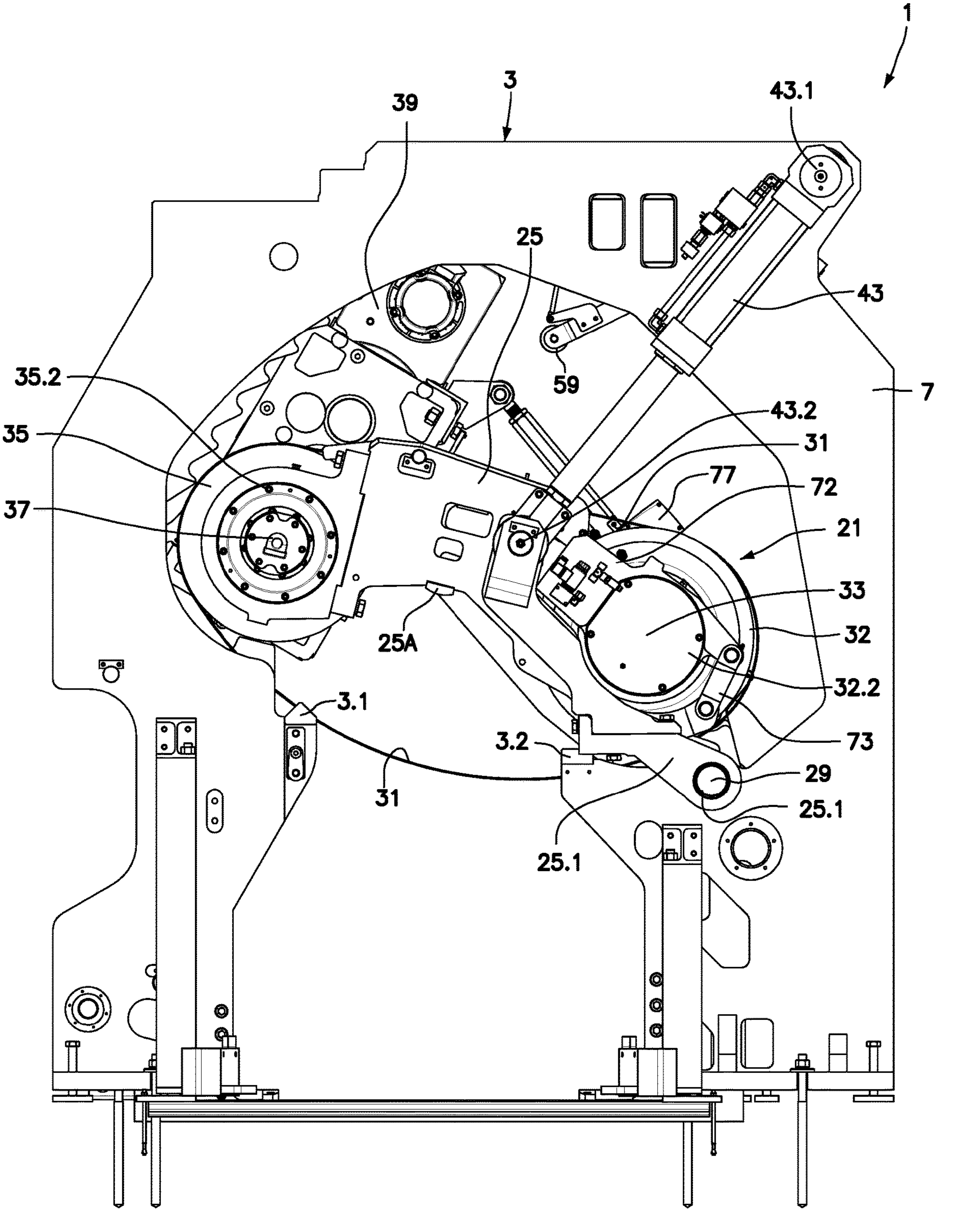
FIG. 11 shows a lateral view similar to the view of FIG. 7 with the pressing unit lowered.
Figure 12:
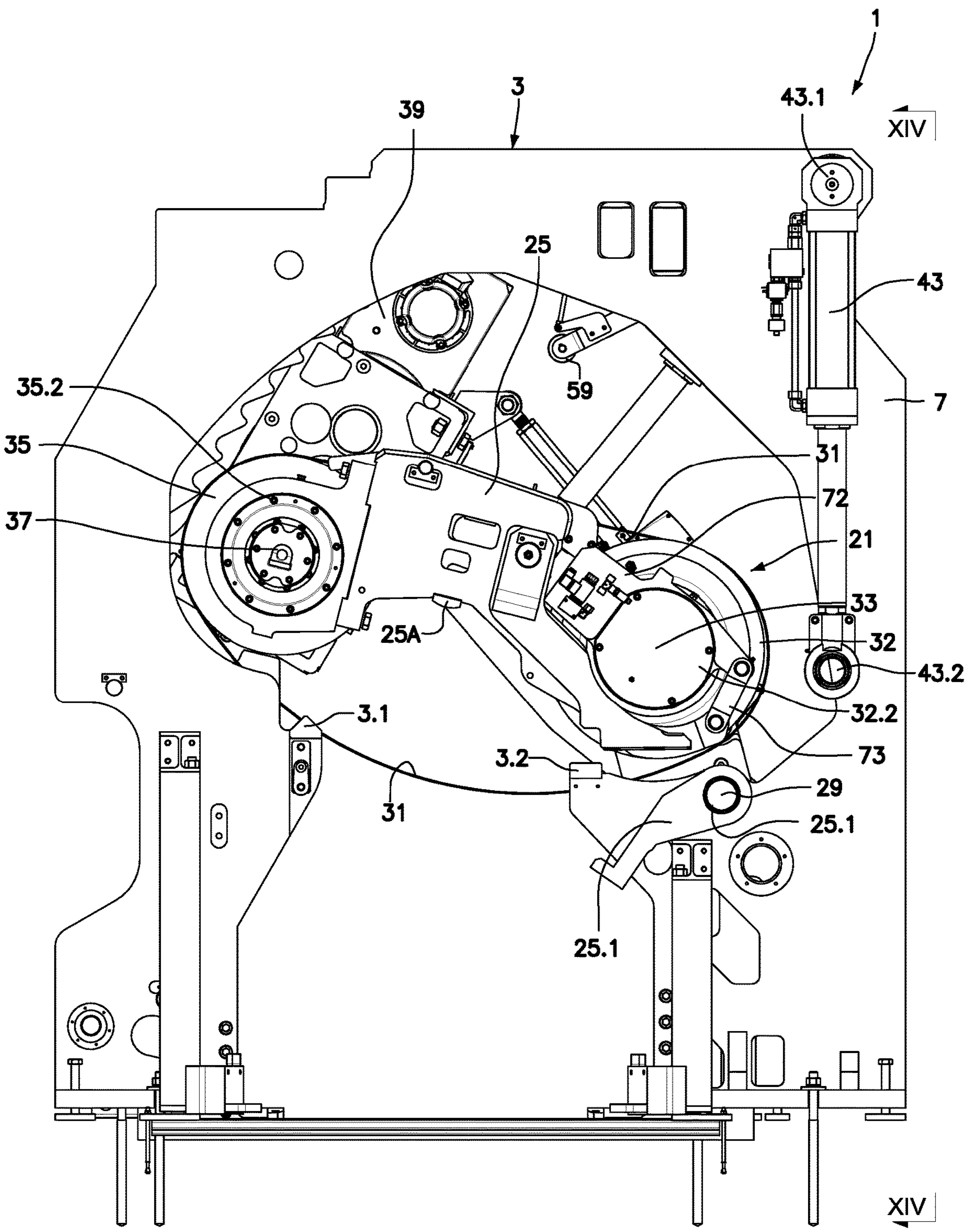
FIG. 12 shows a lateral view similar to the view of FIG. 11 with the actuator of the pressing unit detached from the respective pivoting arm.

The lowered position of the pivoting structure is shown in FIG. 10, on the side of the side wall 5 and in FIGS. 11 and 12 from the side of the side wall 7. The position of the pivoting structure in this operating step is defined by a fixed abutment 61 and by a movable abutment 63. The fixed abutment 61 is integrally joined with the load-bearing frame 3, and more precisely with the first side wall 5 of the load-bearing frame 3. The movable abutment 63 is integrally joined with the first pivoting arm 23. The abutments 61, 63 allow to define the lower position of the pivoting structure and to confer greater stability to the pivoting arm 23 during the step of replacing the continuous flexible member 31.

In the lower position of the pivoting structure, shown in FIGS. 10, 11, 12, the continuous flexible member 31 is no longer kept in traction by the stretching bar 53, and the first branch thereof hangs loose in the space left vacant by the cassette 13 with the corrugating rollers 15, 17 thereof.

Upon reaching this position, in order to remove the continuous flexible member 31, the second pivoting arm 25 is firstly separated from the side wall 7 of the load-bearing frame 3. To this end, the bracket 25.2 is detached from the rest of the arm 25 and rotated downwards about the pivoting axis 29, as shown in FIGS. 11 and 12. Furthermore, the actuator 43 is separated from the arm 25, as shown in FIGS. 11 and 12.

In some embodiments, not shown, the pivoting arm 25 may not be pivoted to the load-bearing frame 3 by means of the hinge thereof. In this case the bracket 25.2 is not provided for and the disengagement of the pivoting arm 25 from the load-bearing frame 3 is faster, given that it only requires the separation of the actuator 43.

In FIG. 12 the arm 25 is basically separated from the load-bearing frame 3. It is held, in a cantilevered fashion, by the beam 27 constrained to the pivoting arm 23. This is constrained to the load-bearing frame 3 by the two hinges 23.2, 23.3, by the actuator 41 and by the abutment 63, which rests on the abutment 61.

The continuous flexible member 31 can thus be removed from the guide rollers 32, 35, as shown in the axonometric view of FIG. 13. Once the worn continuous flexible member 31 has been removed, it can be replaced with a new continuous flexible member 31. The guide rollers 32, 35, the continuous flexible member 31 and the pivoting arms 23, 25 are returned to the raised position of FIGS. 6, 7, 8. by means of reverse operations with respect to those described above.

Figure 4:
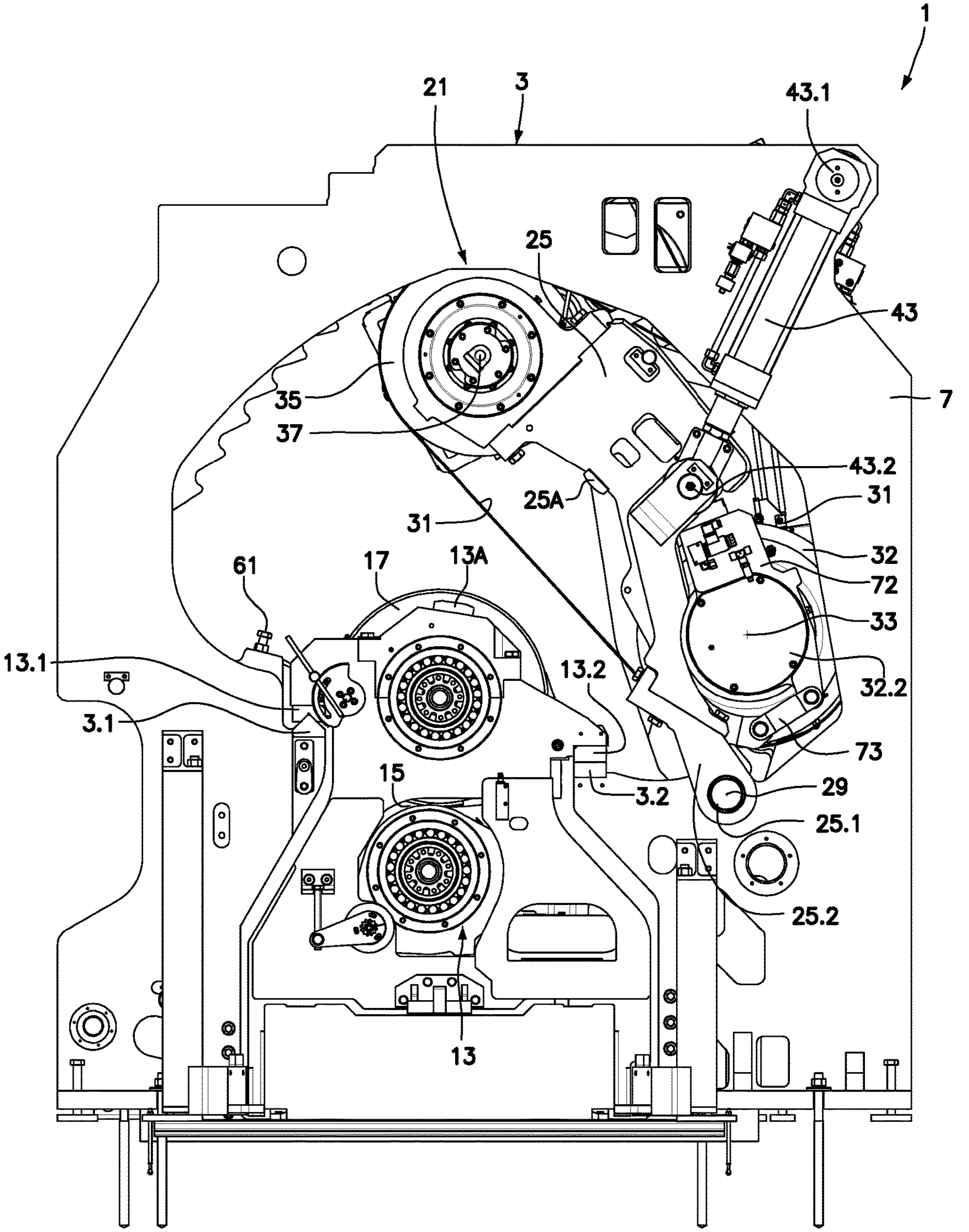
FIG. 4 shows a lateral view similar to FIG. 2, with the pressing unit raised.

In this position, the new continuous flexible member 31 is kept in traction by the stretching bar 53, so that the first branch of the continuous flexible member 31 takes a rectilinear shape and vacates the underlying space, in which the cassette 13 is inserted with the first corrugating roller 15 and the second corrugating roller 17 (FIGS. 3, 4, 5). Subsequently, the pressing unit comprising the continuous flexible member 31, the guide rollers 32, 35, the pivoting arms 23, 25 and the beam 27 is lowered to the working position (FIGS. 1, 2).

When the single facer 1 is in the working position, the continuous flexible member 31 must be kept correctly stretched and guided about the guide rollers 32, 35 The width of the continuous flexible member 31 and the axial length of the guide rollers 32, 35 are very large with respect to the length of the continuous flexible member. This makes guiding the continuous flexible member 31 particularly critical. In order to keep the continuous flexible member 31 correctly stretched and guided, an adjustment and guiding arrangement of the continuous flexible member 31 is provided, described below, with particular reference to FIGS. 14 to 23. This system serves to maintain the correct stretch of the continuous flexible member 31, to prevent or correct any skidding in the transverse direction, i.e. displacements along the axis of the guide rollers 32, 35, and to avoid or correct twisting of the continuous flexible member 31. Twisting occurs when the two edges of the continuous flexible member 31 advance unevenly, such that a line of the continuous flexible member 31 originally parallel to the rotation axes of the guide rollers 32, 35 is displaced, taking a position no longer parallel to such rotational axes.

In the illustrated embodiment, respective actuators are associated with the pivoting arms 23, 25, which adjust the distance between the rotation axes of the two guide rollers 32, 35, independently for the two sides of the single facer 1. Furthermore, provided on one of the two sides of the single facer 1 is a further actuator, associated with one end of one of the two guide rollers 32, 35, which adjusts the inclination of the axis of such guide roller in a transversal direction, and preferably approximately orthogonal to the adjustment direction of centre-to-centre distance of the guide rollers.

More in particular, the first guide roller 32 is supported on the first pivoting arm 23 by means of a first support 32.1 and on the second pivoting arm 25 by means of a second support 32.2. Similarly, the second guide roller 35 is supported by means of a first support 35.1 thereof to the first pivoting arm 23 and by means of a second support 35.2 to the second pivoting arm 25.

In the illustrated embodiment, the supports 35.1 and 35.2 of the second guide roller 35 are mounted in a fixed position with respect to the first pivoting arm 23 and with respect to the second pivoting arm 25, while the supports 32.1 and 32.2 of the first guide roller 32 are mounted so that they can move in a controlled manner with respect to the first pivoting arm 23 and the second pivoting arm 25 as described in detail hereinafter.

Figure 20:
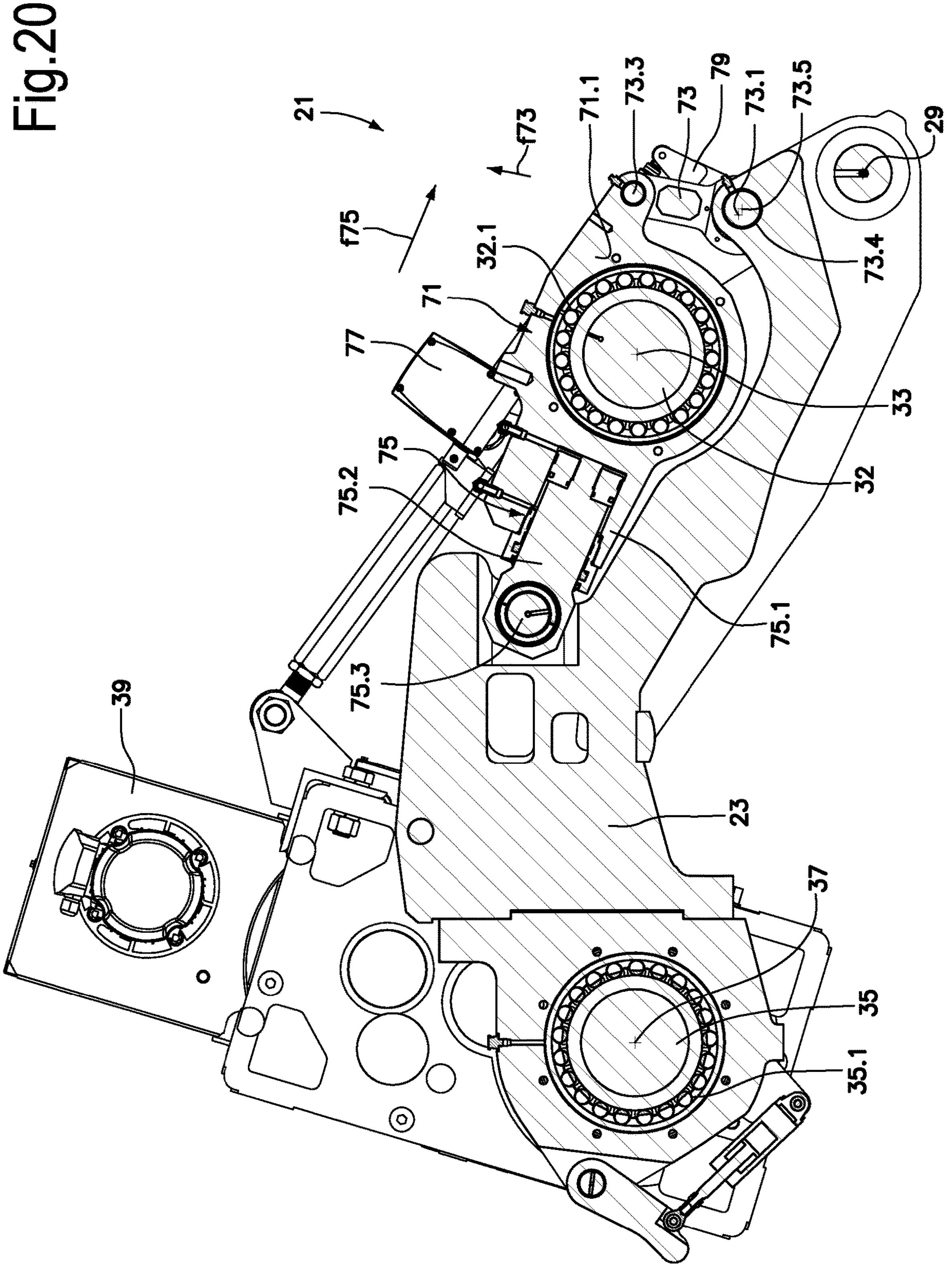
FIG. 20 shows a section according to XX-XX of FIG. 17.
Figure 21:
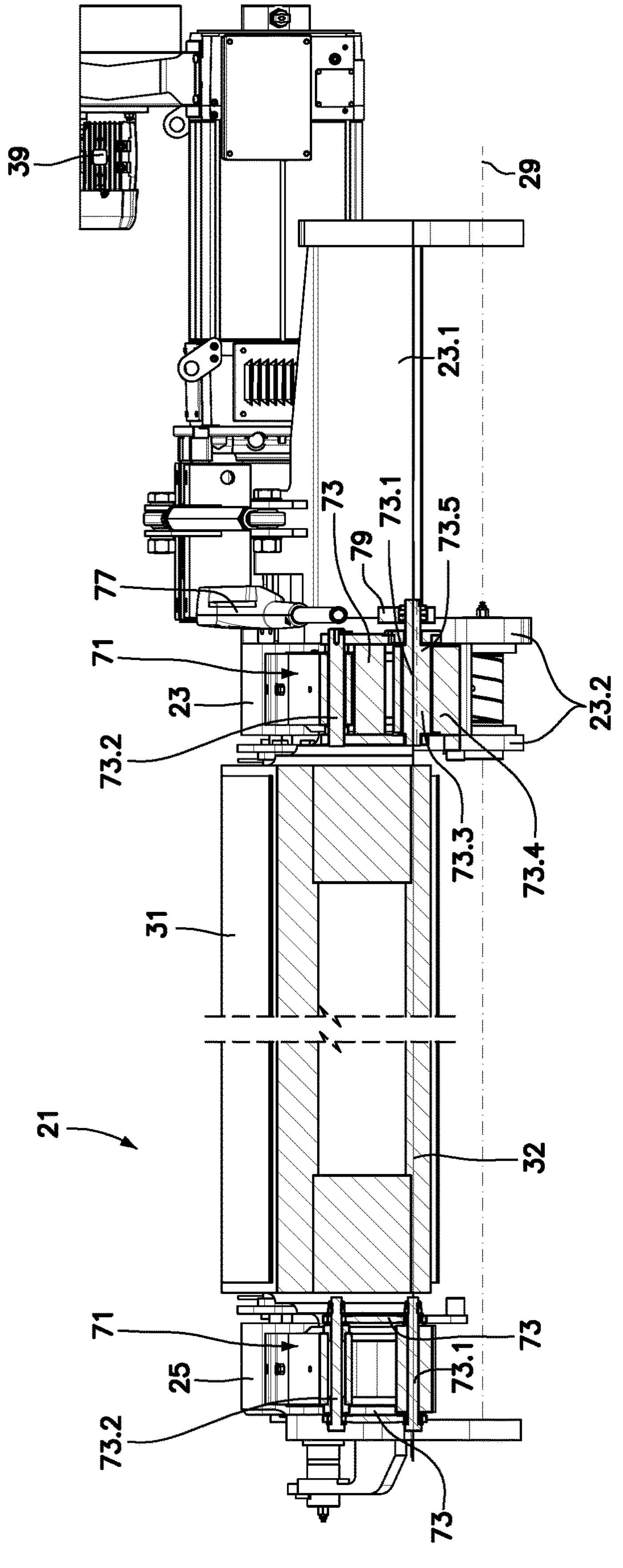
FIG. 21 shows a section according to XXI-XXI of FIG. 19.
Figure 22:
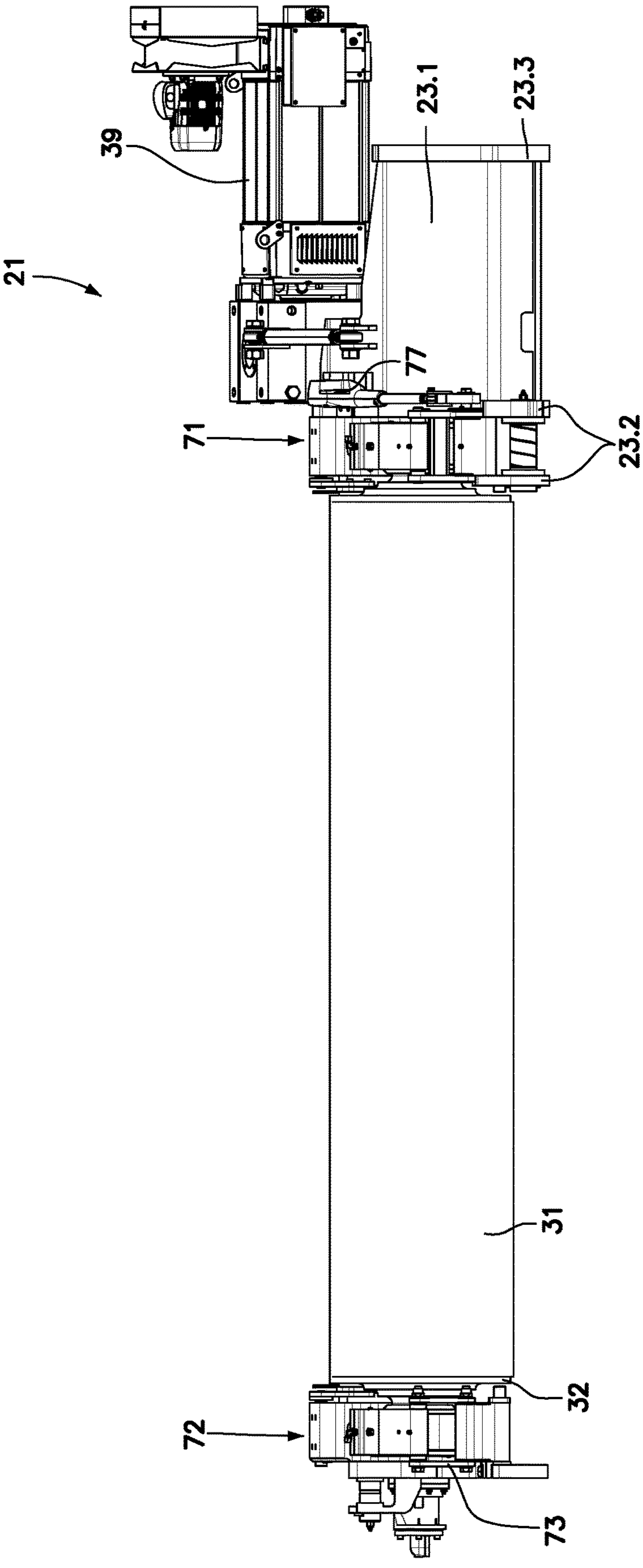
FIG. 22 shows a section according to XXII-XXII of FIG. 19.

In the illustrated embodiment, the first support 32.1 of the first guide roller 32 and the second support 32.2 of the first guide roller are mounted in respective movable units, one of which is indicated in detail in the section of FIG. 20 and indicated with 71. The supports 32.1 and 32.2 are pivoting supports, i.e. they allow a variation of the inclination of the rotation axis 33 of the first guide roller 32, for the purposes and in the manner described below.

The movable unit 71 contains the first support 32.1 of the first guide roller 32 and it connects it to the first pivoting arm 23 as described hereinafter. The second support 32.2 of the first guide roller 32 is mounted in the same way, with a similar movable unit 72, on the second pivoting arm 25, see in particular FIGS. 17, 18, 19 and 20.

With specific reference to FIG. 20, the movable unit 71 has a seat 71.1 for the first support 32.1 of the first guide roller 32. The movable unit 71 is constrained with the pivoting arm 23 by means of a rocker arm 73, pivoted to the movable unit 71 at one end and to the pivoting arm 23 at the opposite end. The axes for pivoting the rocker arm 73 to the arm 23 and to the movable unit 71, respectively, are indicated with 73.1 and 73.2.

The movable unit 71 is further constrained to the pivoting arm 23 by means of a first actuator 75 for adjusting the traction of the continuous flexible member 31. In the illustrated embodiment, the first actuator 75 is a linear actuator, for example a cylinder-piston actuator, preferably of the double-acting hydraulic type.

In the illustrated embodiment, the actuator 75 comprises a cylinder 75.1 formed in the movable unit 71, within which a piston 75.2 slides. In turn, the stem of the piston 75.2 is pivoted to the first pivoting arm 23 in 75.3. The movement of the actuator 75 causes a pivoting of the rocker arm 73 and an ensuing movement of the rotation axis 33 of the first guide roller 32 with respect to the pivoting arm 23.

A similar arrangement is provided for connecting the second support 32.2 of the first guide roller 32 to the second pivoting arm 25.

Acting on the two actuators 75 associated with the two supports 32.1 and 32.2 allows to modify the traction of the continuous flexible member 31 due to the variation of the distance between the rotation axes 33 and 37 of the two guide rollers 32, 35.

The two actuators 75 on the two sides of the single facer 1 can be actuated independently of each other, in the sense that they allow independent adjustments of the position of the respective support 32.1 and 32.2 of the first guide roller 32 in relation to the corresponding support 35.1 and 35.2 of the second guide roller 35. This allows to keep the continuous flexible member 31 guided properly and stretched properly. The independent actuation of the actuators 75 allows to modify the inclination of the rotation axis 33 of the first guide roller 32, so that it is not perfectly parallel to the rotation axis 37 of the second guide roller 35. This variation of the inclination may serve, for example, to compensate or correct a twisting of the continuous flexible member 31.

The actuators 75 can be controlled by a control unit, not shown, based on signals coming from sensors, not shown, with which the single facer 1 is equipped. For example, there can be provided load cells for detecting the traction of the continuous flexible member 31, which corresponds to a determined pressure against the second corrugating roller 17 and thus a determined gluing pressure between the smooth paper web and the fluted paper web. Furthermore, sensors may be provided, which read the position of one or both longitudinal edges of the continuous flexible member 31. Alternatively, the traction can be determined simply as a function of the pressure of the hydraulic fluid with which the actuators 75 are controlled.

More particularly, based on the signals of these sensors, it is possible to correct possible displacements of the continuous flexible member 31 by differentially acting on the two actuators 75 and thus causing a variation in the inclination of the rotation axis 33 of the first guide roller 32. Acting simultaneously on the two actuators 75, by imposing the same movement thereon causes a translation of the rotation axis 33 parallel to itself and thus the traction of the continuous flexible member 31 varies.

Figure 18:
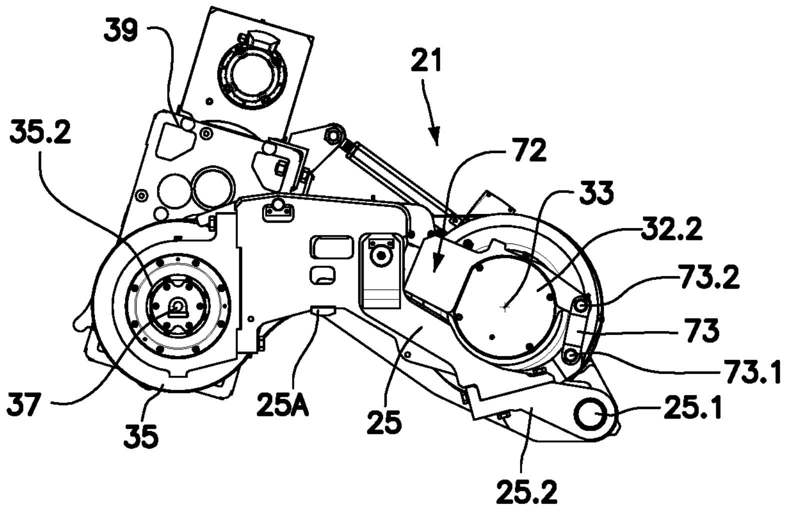
FIG. 18 shows a view according to XVIII-XVII of FIG. 17.

In the illustrated embodiment, the pivoting axis 73.1 of the rocker arm 73 associated with the pivoting arm 25 is fixed (see FIG. 18). On the other hand, the pivoting axis 73.1 of the rocker arm 73 associated with the pivoting arm 23 is movable, so as to impart a further adjustment movement to the first guide roller 32. This further movement will be clearer with reference to FIGS. 19, 20 and 21. The pivoting axis 73.1 of the rocker arm 73 associated with the first pivoting arm 23 consists of an eccentric 73.3 which is housed in a seat 73.4 of the pivoting arm 23 (see FIG. 20). The eccentric 73.3 rotates in the seat 73.4 about an axis 73.5 parallel to the pivoting axis 73.1 of the rocker arm 73 but spaced therefrom. In the illustrated embodiment, the rotation of the eccentric 73.3 is controlled by a linear actuator 77, for example an electrically controlled jack, by means of a lever 79 (see FIG. 19).

The rotation of the eccentric 73.3 about the axis 73.5 causes a displacement of the pivoting axis 73.1 of the rocker arm 73 with respect to the pivoting arm 23. In FIG. 20, the approximate direction of this displacement is indicated with f73. This direction is transverse with respect to the direction of the displacement imparted by the linear actuator 75, indicated with f75. In this manner, on the side of the first pivoting arm 23, the first support 32.1 of the first guide roller 32 can be displaced according to two directions substantially orthogonal to each other. The displacement according to arrow f75 (FIG. 20) imparted by the actuator 75 serves to adjust the traction of the continuous flexible member 31 and it can be coordinated with a corresponding movement imparted by the corresponding actuator 75 of the second support 32.2. The displacement imparted by the actuator 77 by means of the eccentric 73.3 can be used to correct the displacements of the continuous flexible member 31, for example a lateral skidding, parallel to the rotation axes of the guide rollers 32, 35. A homologous displacement of the support 32.2 on the side of the second pivoting arm 25 is not necessary.

Figure 24A:
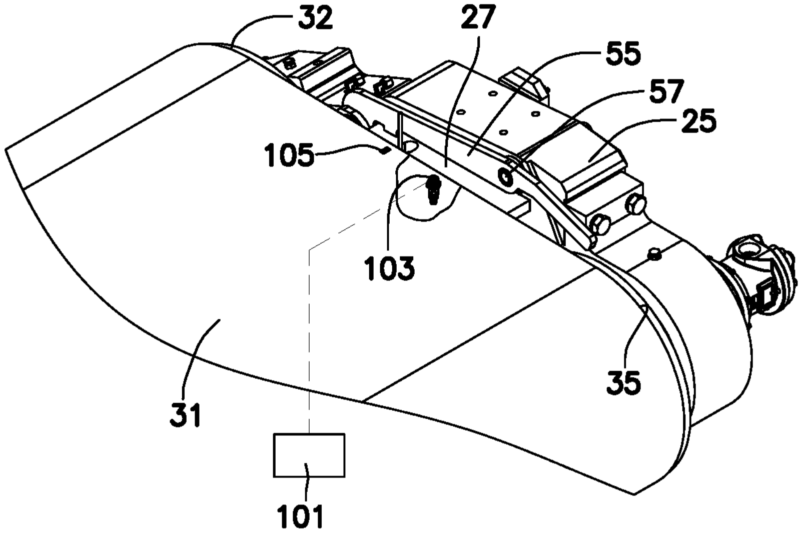
FIGS. 24A and 24B show partial axonometric views of the pressing unit 21 showing the sensors for detecting the position of the continuous flexible member 31.
Figure 24B:
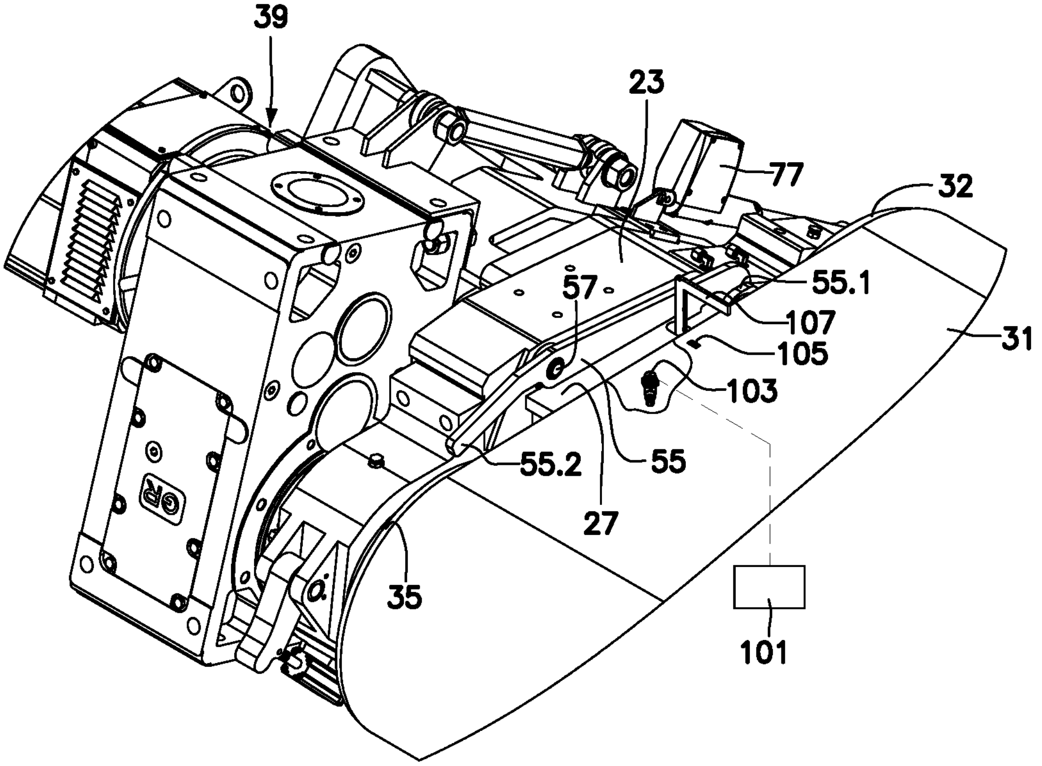

FIGS. 24A to 28B show further details useful for understanding the control of the traction and of the position of the continuous flexible member 31. More particularly, FIGS. 24A and 24B show, in an axonometric view, details of the pivoting arms 23, 25 and of the continuous flexible member 31 guided about the guide rollers 32 and 35. FIGS. 24A and 24B represent sensors for detecting the displacements of the continuous flexible member 31, which provide signals to a central unit 101 which controls the actuators described above, to keep the continuous flexible member 31 in the correct position.

In the illustrated embodiment, arranged on each pivoting arm 23, 25 is at least one respective sensor 103, for example a magnetic sensor, which detects the twisting of the continuous flexible member 31. To this end, elements detectable by the sensors 103, for example two magnets 105, are inserted along the two edges of the continuous flexible member 31. The two magnets 105 are aligned on a line orthogonal to the edges of the continuous flexible member 31. Thus, they pass simultaneously in front of the respective sensors 103 if the continuous flexible member 31 reveals no twists or torsions. A twisting of the continuous flexible member 31 entails a mutual offset of the two magnets 105 along the direction of advancement of the continuous flexible member 31. This is detected through a delay of a signal of one sensor 103 with respect to the signal of the other sensor and this provides the central unit 101 with information on the need to correct the two actuators 75 by means of differential actuation.

Possible lateral skidding of the continuous flexible member 31 can be detected with a respective arrangement of sensors. In the illustrated embodiment, provided is a sensor 107 on one of the pivoting arms 23, 25 and more particularly in the illustrated example on the pivoting arm 23. The sensor 107 can be an optical sensor, for example comprising one or more photocells aligned orthogonally to the edge of the continuous flexible member 31, so as to identify the position thereof. For example, there can be used optical fibre sensors, with a plurality of optical fibres along the direction orthogonal to the edge of the continuous flexible member, which detect an optical signal coming from an opposite emitter, positioned on the opposite face of the continuous flexible member 31. The lateral skidding in one direction or the other of the continuous flexible member 31 leads to a variation in the number of photocells or optical fibres which see the light signal emitted by the opposite emitter. The signal obtained is used by the central unit 101 to emit a control signal for the linear actuator 77, which corrects any skidding.

The possibility of using combined movements of the actuators 77 and 75 to correct skidding and twisting movements cannot be ruled out.

Figure 25A:
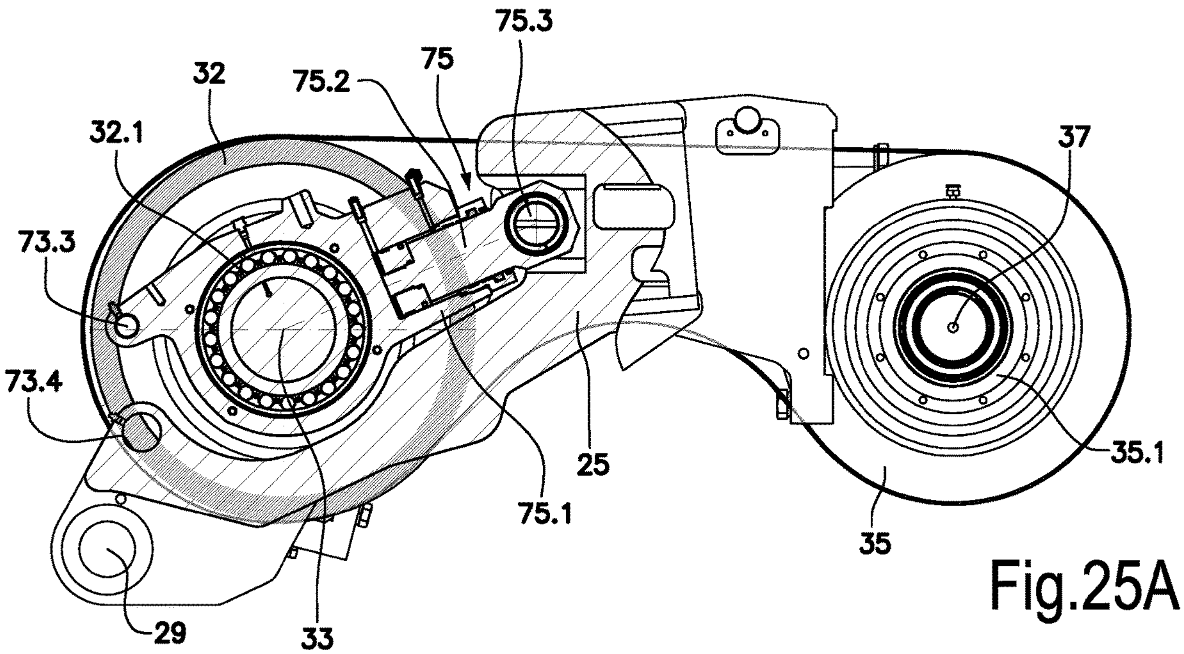
FIGS. 25A, 25B show two schematic lateral views of the pressing unit illustrating the movement of one of the two guide rollers of the continuous flexible member to adjust the stretch thereof.
Figure 25B:
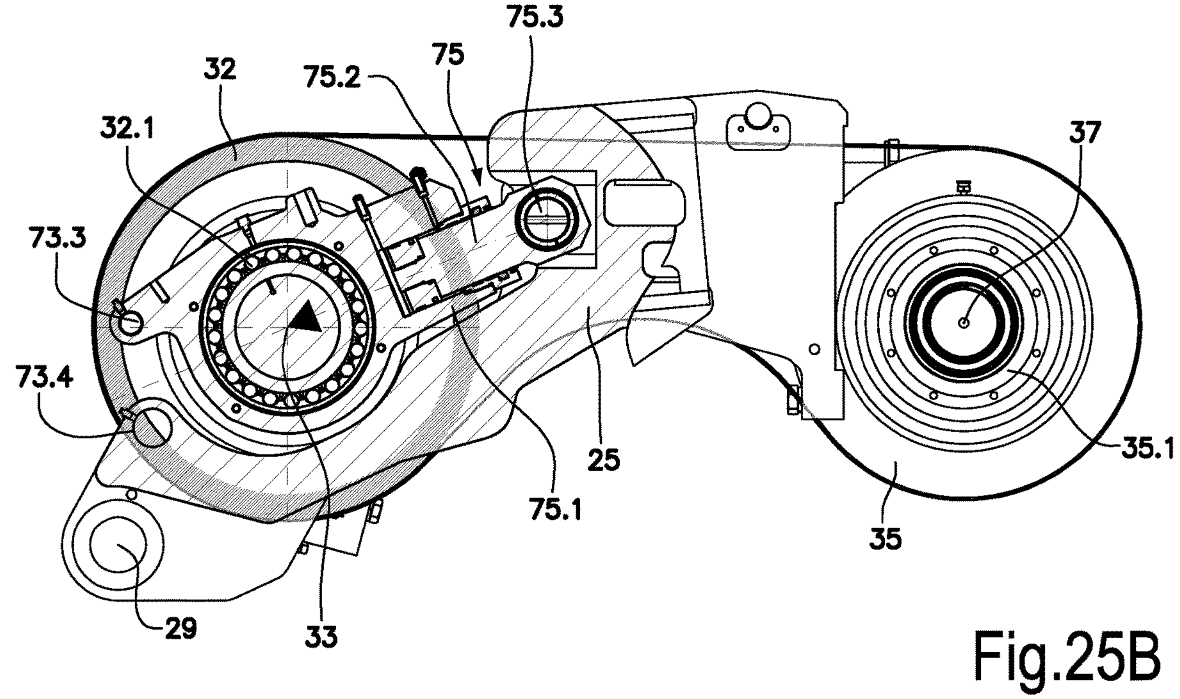

FIGS. 25A and 25B show in greater detail how the control of the traction of the continuous flexible member is carried out by means of simultaneous actuation of the actuators 75.

In FIG. 25A, the continuous flexible member 31 is not stretched, whereas in FIG. 25B it is stretched due to the effect of an equal elongation of the two actuators 75 and an ensuing moving of the guide roller 32 away with respect to the guide roller 35, keeping the axes of the two guide rollers parallel to each other.

Figure 26:
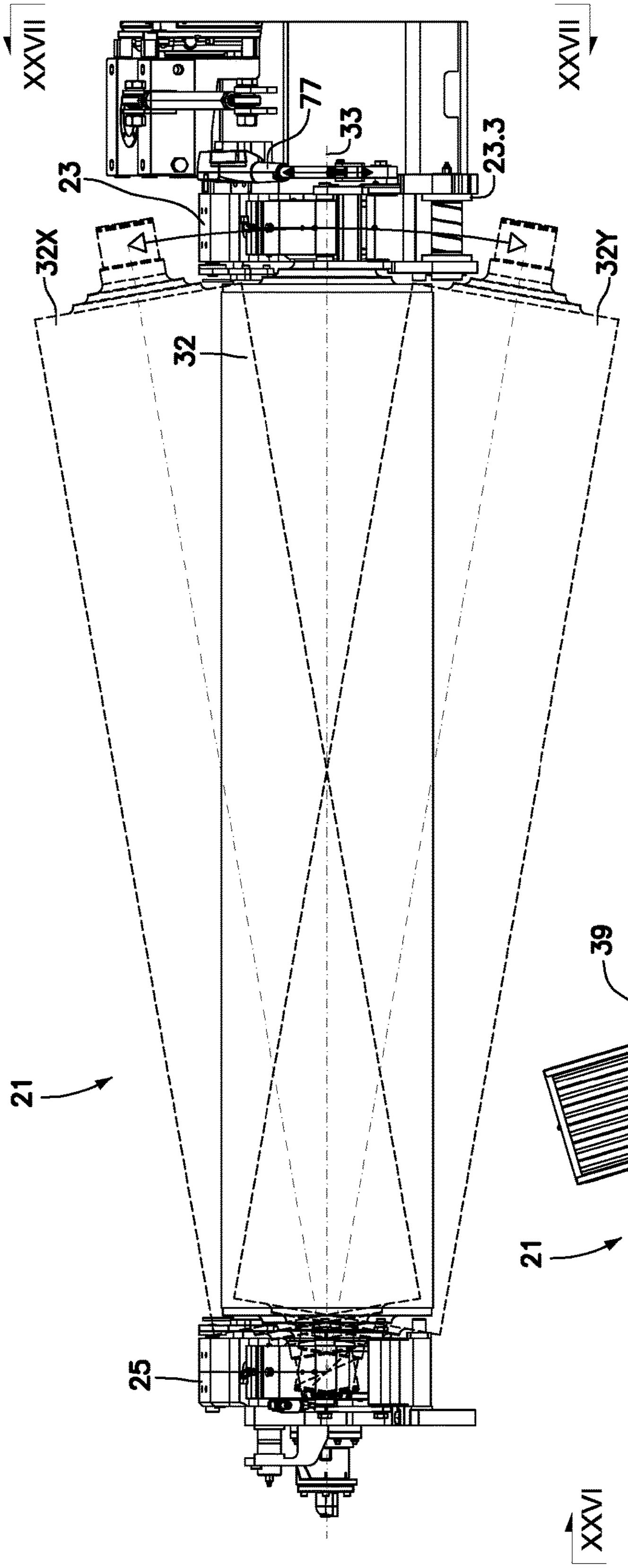
FIGS. 26 and 27 show two schematic views of the pressing unit, illustrating the movement of one of the guide rollers of the continuous flexible member to correct the twisting thereof.
Figure 27:
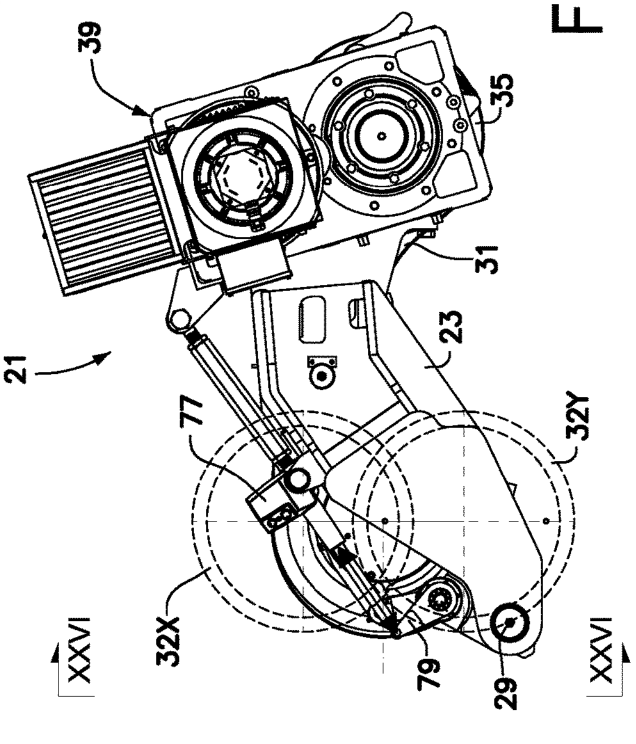

FIGS. 26 and 27 show the displacements of the first guide roller 32 caused by the linear actuator 77 to correct lateral skidding movements of the continuous flexible member. More in particular, FIG. 26 is a rear view according to XXVI-XXVI of FIG. 27 and FIG. 27 is a lateral view according to XXVII-XXVII of FIG. 26 of the pressing unit 21. Two inclined positions of the first guide roller 32 are indicated with 32X and 32Y. For greater clarity, the displacements are represented as much greater than actual ones.

Figure 28A:
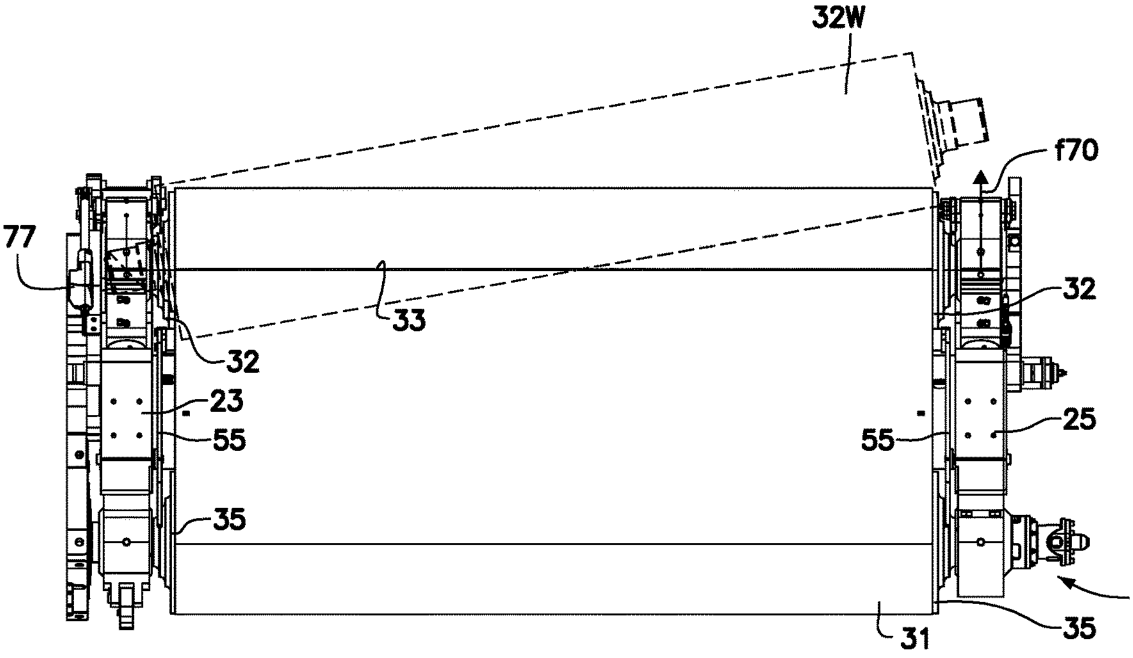
FIGS. 28A, 28B show two schematic views of the pressing unit illustrating the movement of one of the two guide rollers of the continuous flexible member to correct the twisting thereof.
Figure 28B:
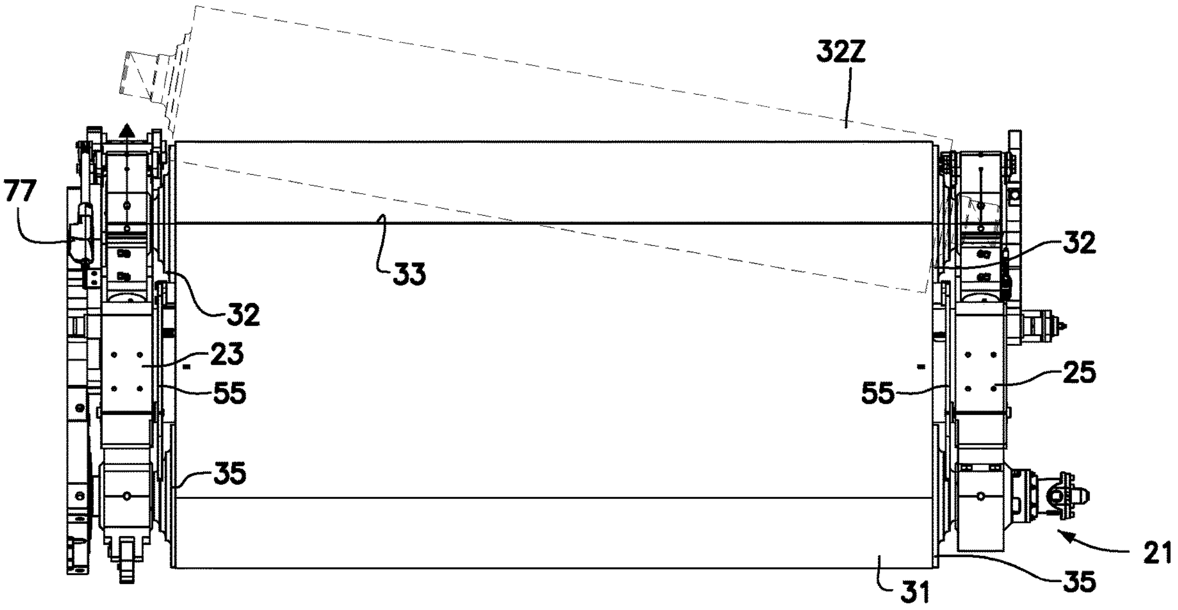

FIGS. 28A and 28B show, in a top view of the pressing unit 21, the displacements of the first guide roller 32 controlled by differential strokes of the actuators 75 to correct possible twists of the continuous flexible member 31. Positions inclined in opposite directions of the first guide roller 32 obtained by means of differentiated actuations of the actuators 75 are indicated with 32Z and 32W. Like for FIGS. 26 and 27, also in FIGS. 28A, 28B the displacements are shown much greater than with respect to actual ones, for greater clarity of representation.

The invention has been described in terms of various specific embodiments. However, to those skilled in the art it will be clear that many modifications, changes and omissions are possible without departing from the spirit and scope of the invention, defined by the following claims.

The invention claimed is:

1. A single facer for manufacturing a single face corrugated board, the single facer comprising:
- a load-bearing frame;
- a first corrugating roller and a second corrugating roller, meshing with each other and associated with the load-bearing frame;
- a pivoting structure pivoted to the load-bearing frame about a pivoting axis;
- a first guide roller rotatably supported about a first rotation axis on the pivoting structure;
- a second guide roller rotatably supported about a second rotation axis on the pivoting structure;
- a continuous flexible member, guided about the first guide roller and the second guide roller; wherein the continuous flexible member comprises a first branch, facing toward the second corrugating roller, and a second branch, opposite the second corrugating roller;
- a control system adapted to displace the pivoting structure to a working position, wherein the continuous flexible member is pressed against the second corrugating roller, and to a raised position, wherein the first guide roller and the second guide roller are spaced from the second corrugating roller; and
- a stretching device adapted to stretch the continuous flexible member when the pivoting structure is in the raised position, comprising a stretching bar, extending approximately parallel to the first rotation axis of the first guide roller and the second rotation axis of the second guide roller and carried by the pivoting structure pivoted to the load-bearing frame; wherein the stretching bar is positioned between the first branch and the second branch of the continuous flexible member; and wherein the stretching bar is moveable with respect to the first guide roller and to the second guide roller to push the second branch of the continuous flexible member and stretch the first branch of the continuous flexible member between the first guide roller and the second guide roller when the pivoting structure is in the raised position and the continuous flexible member is spaced from the second corrugating roller.

2. The single facer of claim 1, wherein the first corrugating roller and the second corrugating roller are mounted on an interchangeable cassette.

3. The single facer of claim 1, wherein the stretching bar is actuated by abutments associated with the load-bearing frame.

4. The single facer of claim 3, wherein the stretching bar is supported by a pair of pivoting levers, pivoted to the pivoting structure, the pivoting levers being adapted to co-act with the abutments associated with the load-bearing frame, so that when the pivoting structure rises from the working position toward the raised position, the pivoting levers come into contact with the abutments and rotate with respect to the load-bearing structure stretching the continuous flexible member.

5. The single facer of claim 4, wherein the abutments are elastic.

6. The single facer of claim 1, wherein the pivoting axis is spaced from both the first rotation axis of the first guide roller and the second rotation axis of the second guide roller.

7. The single facer of claim 1, wherein the pivoting structure comprises a first pivoting arm and a second pivoting arm, rigidly connected to each other, at least one of which is pivoted to the load-bearing frame.

8. The single facer of claim 7, wherein the control system comprises a first actuator associated with the first pivoting arm and a second actuator associated with the second pivoting arm.

9. The single facer of claim 1, wherein the pivoting structure comprises a first pivoting arm and a second pivoting arm, rigidly connected to each other, both pivoted to the load-bearing frame.

10. The single facer of claim 1, wherein the control system comprises a first actuator and a second actuator, arranged on opposite sides of the single facer.

11. A method for operating the single facer according to claim 1, 2, 3, 4, 5, 6, 7, 9, 10 or 8, wherein steps are carried out to replace the first corrugating roller and the second corrugating roller as follows:
- raising the pivoting structure by moving the first guide roller and the second guide roller away from the first corrugating roller and the second corrugating roller;
- when the pivoting structure is in the raised position, keeping the continuous flexible member stretched by the stretching device;
- removing the first corrugating roller and the second corrugating roller from the load-bearing frame;
- inserting a new first corrugating roller and a new second corrugating roller into the load-bearing frame; and
- lowering the pivoting structure and pressing the continuous flexible member against the new second corrugating roller.

* * * * *